March 19, 1963 W. R. ZWOYER 3,081,832
AUTOMATIC WEIGHING AND FEEDING APPARATUS
Filed March 25, 1957 8 Sheets-Sheet 1
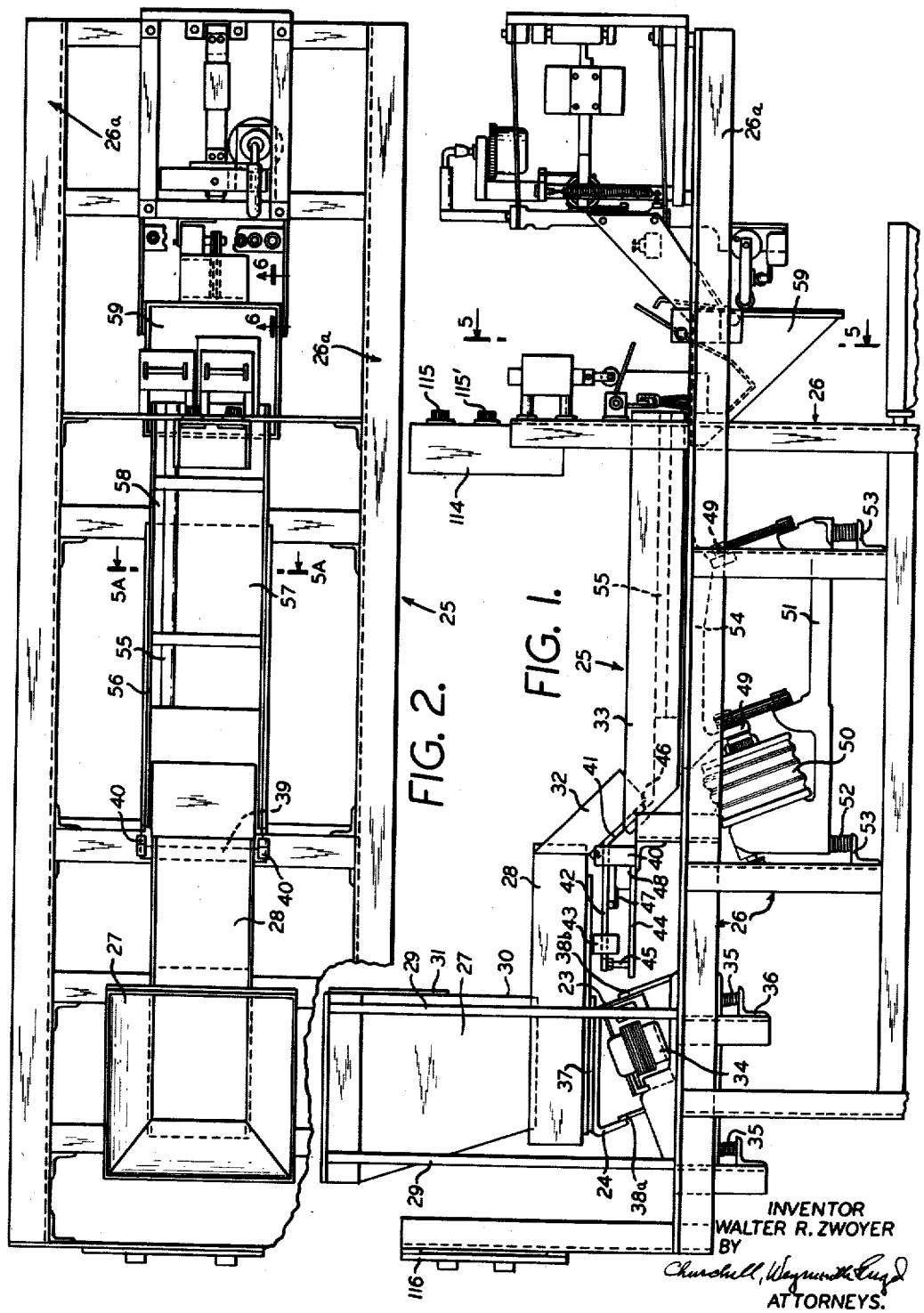
INVENTOR
WALTER R. ZWOYER
BY
Churchill, Weymouth Engl
ATTORNEYS.

March 19, 1963 W. R. ZWOYER 3,081,832
AUTOMATIC WEIGHING AND FEEDING APPARATUS
Filed March 25, 1957 8 Sheets-Sheet 2

INVENTOR
WALTER R. ZWOYER
BY
Churchill, Weymouth & Engel
ATTORNEYS.

March 19, 1963 W. R. ZWOYER 3,081,832
AUTOMATIC WEIGHING AND FEEDING APPARATUS
Filed March 25, 1957 8 Sheets-Sheet 3

INVENTOR
WALTER R. ZWOYER
BY
Churchill Heymouth Engel
ATTORNEYS.

March 19, 1963 W. R. ZWOYER 3,081,832
AUTOMATIC WEIGHING AND FEEDING APPARATUS
Filed March 25, 1957 8 Sheets-Sheet 4

INVENTOR
WALTER R. ZWOYER
BY
Churchill, Weymouth & Engel
ATTORNEYS.

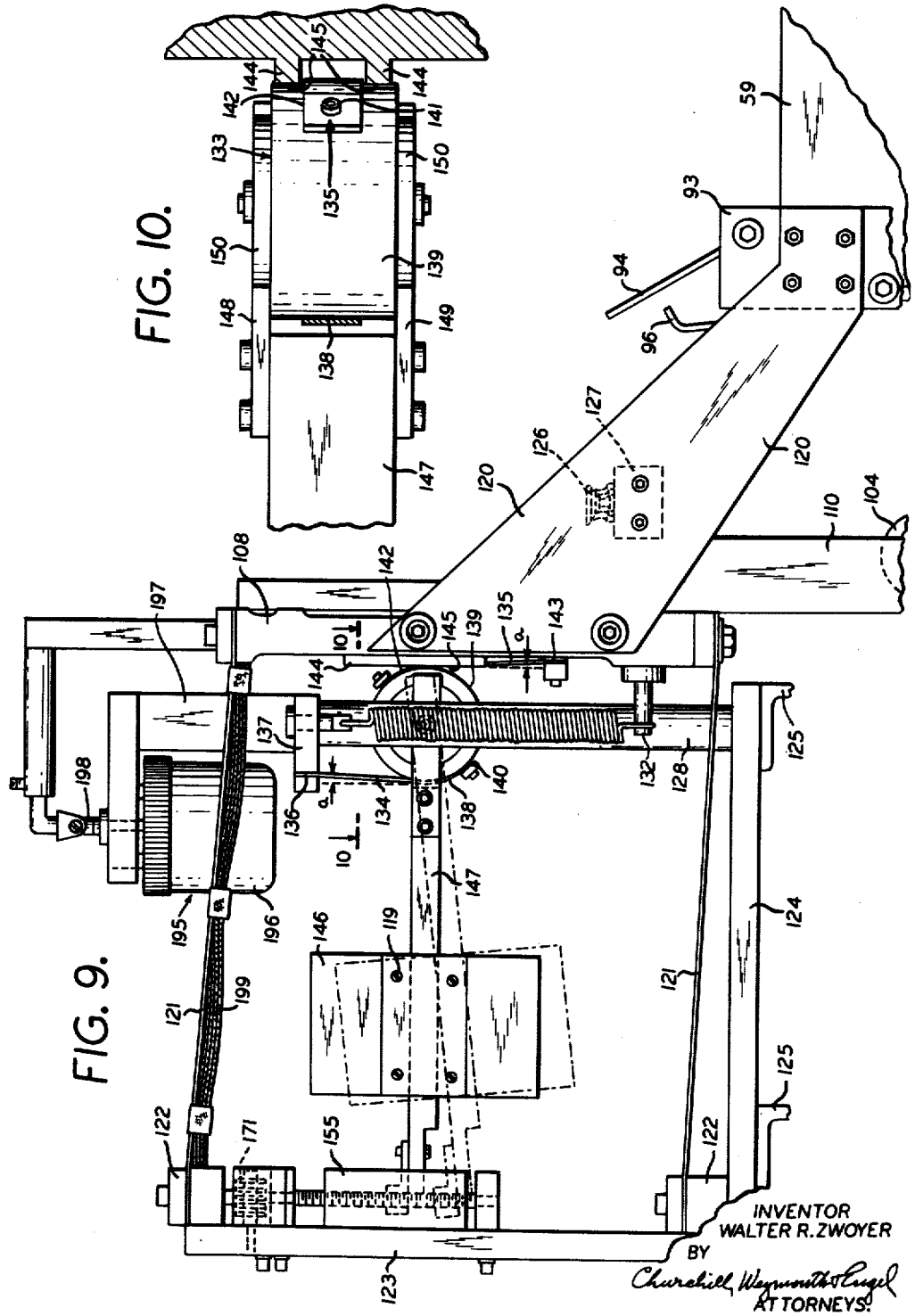

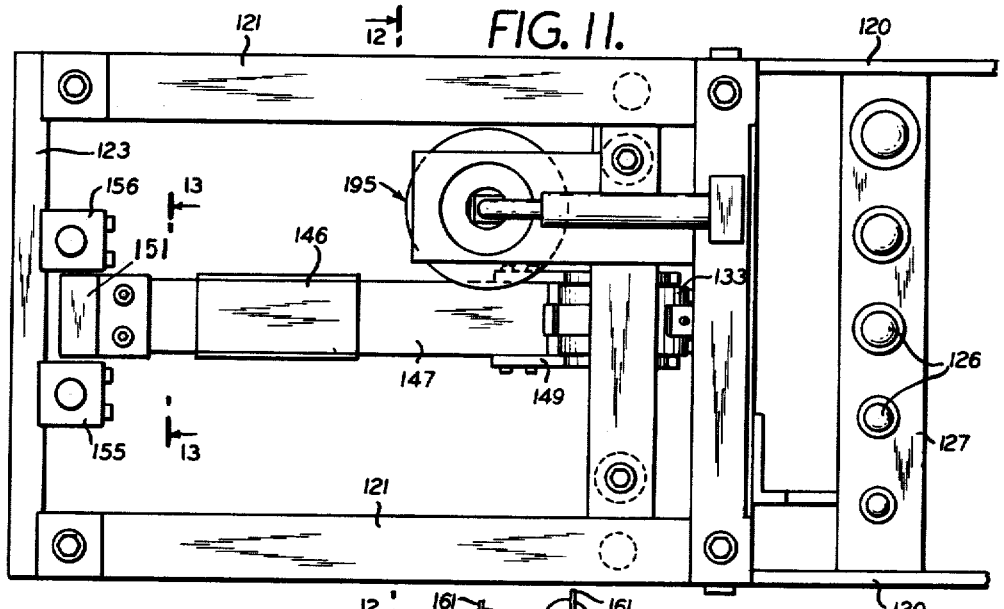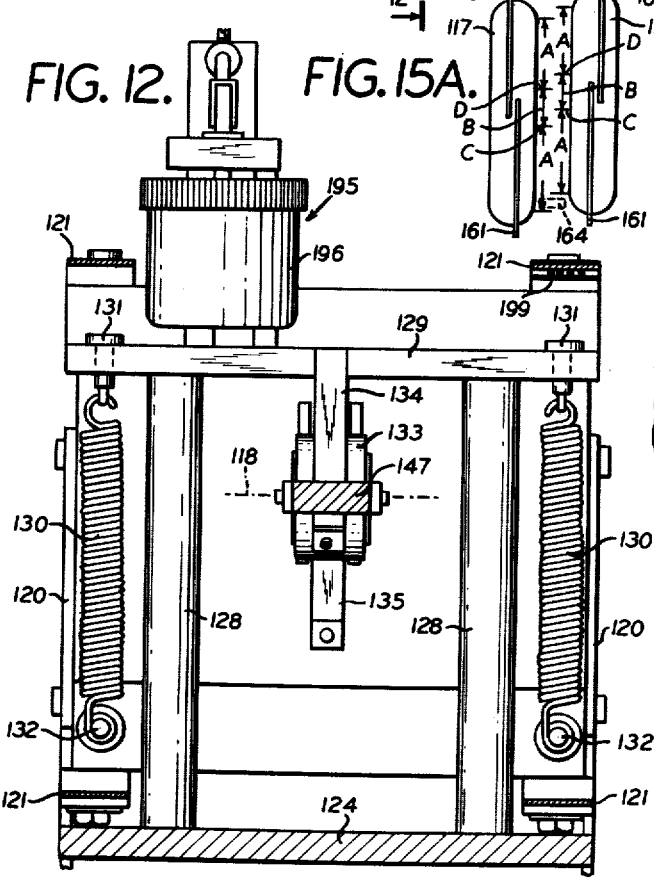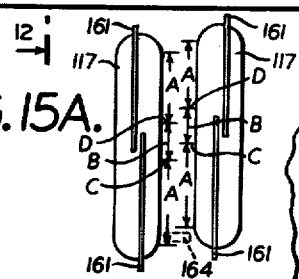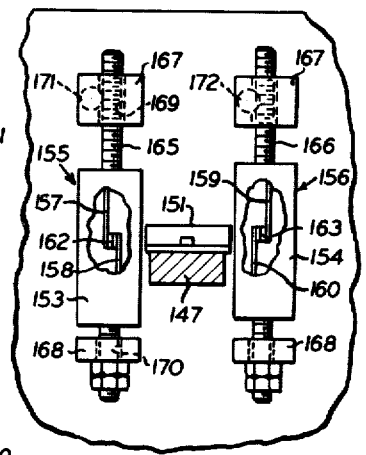

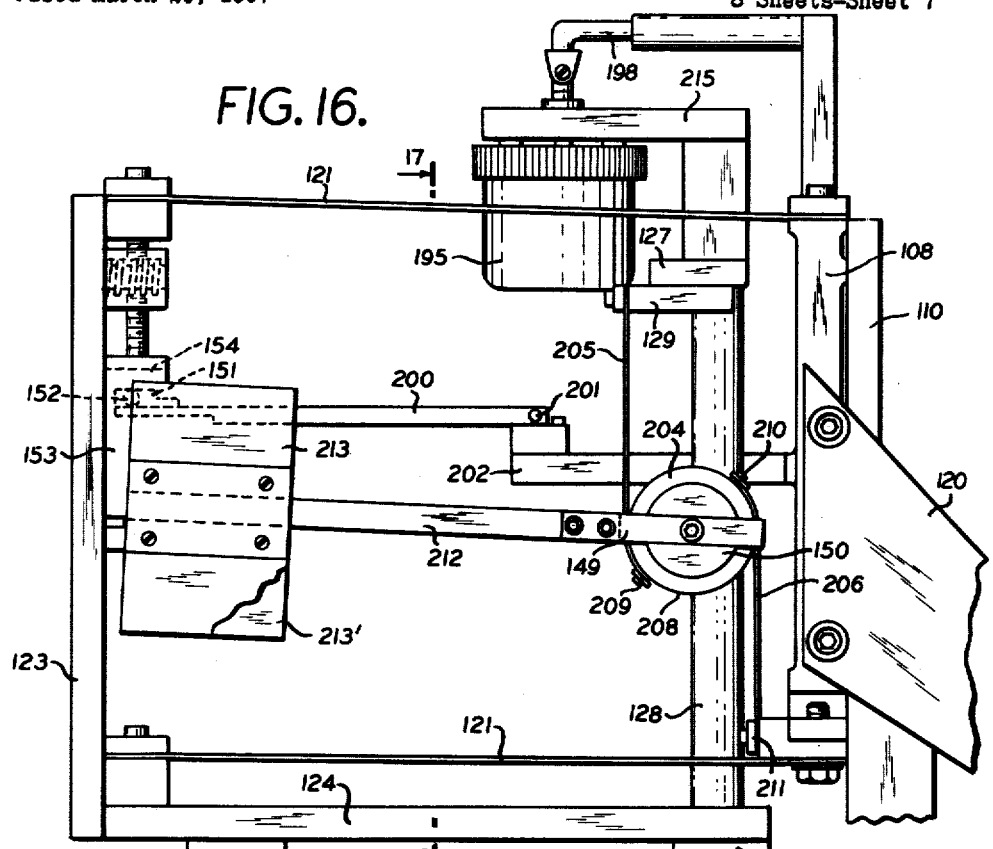

March 19, 1963 W. R. ZWOYER 3,081,832
AUTOMATIC WEIGHING AND FEEDING APPARATUS
Filed March 25, 1957 8 Sheets-Sheet 8
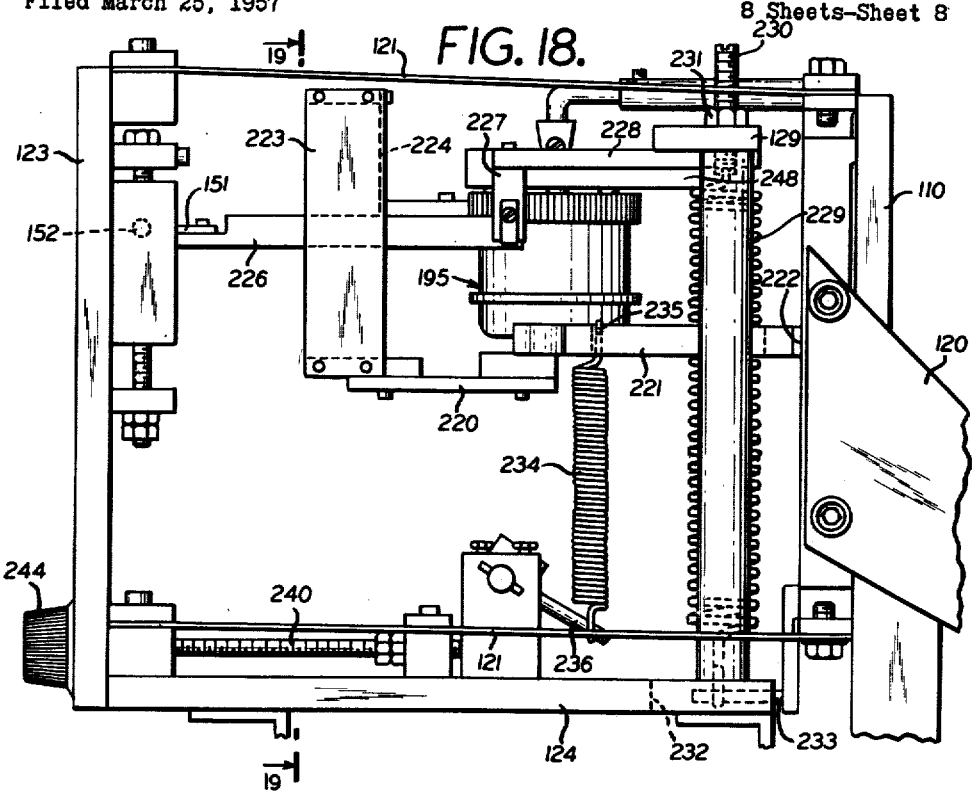
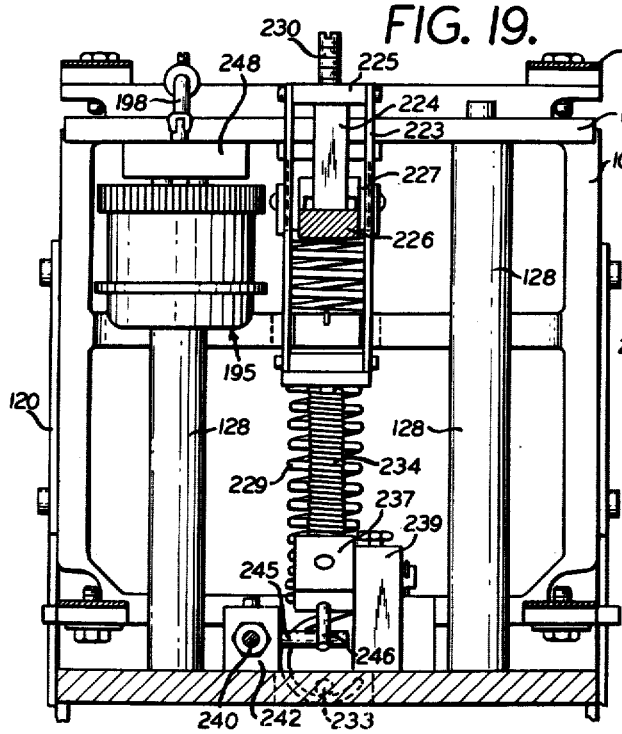
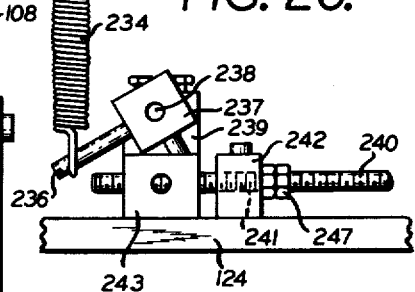
INVENTOR
WALTER R. ZWOYER
BY
Churchill, Waymouth & Engel
ATTORNEYS.

** 3,081,832
AUTOMATIC WEIGHING AND FEEDING
APPARATUS**
Walter R. Zwoyer, Maywood, N.J.; Ruth A. Freebody, The Hackensack Trust Company, and Thelma I. Knoechel, executors of the Estate of said Walter R. Zwoyer, deceased
Filed Mar. 25, 1957, Ser. No. 648,163
34 Claims. (Cl. 177—76)

The present invention relates to apparatus for measuring out and delivering merchandise in bulk and, in particular, contemplates scale apparatus that is brought into balance by measuring out preselected amounts of merchandise to be delivered.

Accordingly, it is the principal object of the instant invention to provide novel feeding apparatus for measuring out and delivering preselected amounts of merchandise in bulk. The apparatus is suitable for foods or other commodities sold in measured quantities, such as: coffee, peanuts, pretzels, hard candies, soap powder, bird seed, and provides accurate deliveries of quantities of merchandise as small as three ounces, or with respect to vegetables and fruits, the apparatus is capable of delivering accurately quantities in the order of five pounds or more.

It is a further object of the instant invention to provide feeding apparatus incorporating novel feeding trough structure for delivering merchandise in bulk to a scale. The merchandise is fed to a bucket subassembly of the scale assembly, which bucket is adapted to undergo alternate phases of operation. During one of such phases, the merchandise is deposited into the bucket and weighed out by the scale; during the other phase, the weighed-out merchandise is delivered by the bucket. The apparatus also includes electrical circuits operatively associated with the scale for regulating the flow of merchandise to the bucket to effect accurate deposits of preselected weights of merchandise into the bucket.

It is a further object of the instant invention to provide apparatus for weighing out and delivering merchandise in bulk comprising, a trough assembly, a bucket assembly cantilever suspended, means for propelling merchandise from the trough to the bucket assembly, a member cantilever suspended and adapted to move along a predetermined path of travel in response to movement of the bucket assembly resulting from deposit of merchandise therein, and switch means operatively responsive to movement of the member for regulating the flow of merchandise into the bucket assembly. Prior art structures employ knife blade fulcrums in order to balance the components thereof. Deposit of merchandise in a bucket balanced on a blade responds non-uniformly as merchandise is deposited in the different parts of the bucket for successive deposits. For example, a deposit in the bucket directly over the fulcrum does not affect balance of the bucket in the same manner as a deposit in the bucket at a point removed from the fulcrum. Accordingly, such prior art structures require continuous attentive measures to prevent deposits of the kind described hereinabove in order to avoid false measurements. In addition, such apparatus requires repeated adjustments and maintenance of knife blade fulcrums, which fulcrums wear with use, to obtain accurate measurements. The invention of the instant embodiment eliminates the enumerated problems and disadvantages of prior art structure. Bucket assembly is cantilever suspended and therefore is not affected by the place of deposit of merchandise therein. In addition, the bucket assembly and the movable member are not suspended by knife blade fulcrums which eliminates the problem of continuous readjustment required by wearing of parts.

In furtherance of the above noted objects, it is an object of the instant invention to provide a scale assembly incorporating known weights cantilever suspended, which invention has a mode of operation such that the scale assembly is first balanced or assumes a predetermined null position by the known weights, next thrown out of balance or displaced from such predetermined null position by removal of weights in amounts substantially equal to the amount of merchandise to be delivered by the apparatus, and then brought back into balance or restored to such predetermined null position when an equivalent weight of merchandise is deposited in the bucket assembly.

It is a further object of the instant invention to provide feeding apparatus adapted to weigh out and deliver predetermined amounts of merchandise in bulk, which apparatus includes novel main and auxiliary feeding troughs; the former is adapted to furnish a substantial portion of the merchandise to a bucket assembly, but up to a weight somewhat less by a known quantity than the weight of merchandise to be weighed out and delivered by the apparatus, whereas the auxiliary trough is adapted to furnish the remaining weight of merchandise to the bucket assembly in a uniform dribble flow, which flow brings a scale assembly of the feeding apparatus progressively into balance or null position to control, in a very accurate manner, the aggregate amount of merchandise to be delivered by the apparatus.

It is a further object of the instant invention to provide novel V-shaped structure for the aforementioned auxiliary trough in order to insure the uniform continuous dribble flow of merchandise therefrom so that the aggregate amount of merchandise to be delivered is accurately weighed out in order to minimize overweight deliveries of merchandise. In furtherance of this object, the auxiliary trough is provided with a V-shaped cross section having opposed walls angularly spaced apart substantially less than 90 degrees.

It is another object of the instant invention to provide a scale for feeding apparatus adapted to weigh out preselected weights of merchandise. The scale contemplates a cantilever suspended bucket into which merchandise in bulk is deposited and weighed out. The scale mechanism is thrown out of balance or null position when empty and progressively brought into balance or null position concurrently with deposit of merchandise into the bucket. In prior art structure, the scale assembly generally remains at a standstill during the initial phase of deposit of merchandise into a bucket whereupon the apparatus is then suddenly brought into balance as it undergoes small displacements within a short period of time. During such action, the prior art structure undergoes undesirable stresses and impacts. Since the present invention contemplates motion of scale apparatus concurrently with deposit of material into the bucket, the mechanical stresses and strains peculiar to prior art arrangements are substantially avoided.

It is a further object of the instant invention to provide feeding apparatus for delivering weighed out batches of merchandise and incorporating main and auxiliary feeding troughs furnishing merchandise to a bucket subassembly of a scale assembly. The scale assembly is operatively associated with an electrical circuit such that movement of the bucket assembly in response to deposit of merchandise therein causes corresponding movement of a scale member operatively associated with switches of the circuit. The circuit, in turn, regulates operation of a pivotal door operatively controlling a main trough feed, a pivotal deflector associated with the auxiliary trough, the operation of the bucket subassembly, and the operation of means for feeding merchandise along the troughs to the bucket so that delivery of predetermined weights of merchandise are accurately accomplished.

In furtherance of the aforementioned object, it is still another object of the instant invention to suspend an auxiliary bucket in the bucket subassembly in closed spaced relationship in respect to said auxiliary trough. The deflector is moved from one to another of two positions, the first of which deflects a uniform dribble flow from the auxiliary trough into the main vessel containing area of the bucket subassembly, and the second position permits dribble flow to deposit into the auxiliary bucket so that the amount of dribble flow in flight towards the auxiliary bucket is uniform and relatively small and thus provides accurate control over weighing out the merchandise to avoid delivery of overweight amounts.

It is a further object of the instant invention to provide switch apparatus responsive to the operation of the aforementioned bucket subassembly wherein accidental propulsion of merchandise to the bucket subassembly is prevented while a quantity of weighed out merchandise is being delivered thereby.

It is a further object of the instant invention to provide in feeding apparatus for weighing out and delivering predetermined quantities of merchandise in bulk, a novel scale assembly, which assembly incorporates a rotatable weighted body suspended between a stationary frame structure and cantilever arms by taut, flexible, non-twisting bands; and a magnet carrying arm member anchored to said body to turn integrally therewith in response to a deposit of merchandise into a bucket assembly also cantilever suspended. The magnet is operatively associated with switches of an electrical circuit to regulate the flow of merchandise to the bucket assembly while merchandise is being weighed out by the scale assembly. The scale assembly is counterbalanced by the weighted body and spring members suspended between the immovable frame structure and the cantilever arms. The magnet carrying end of arm member is adapted to undergo a displacement corresponding to but larger than the displacement experienced by the bucket upon deposit of merchandise therein and thus provides greater sensitivity and better regulation as the scale weighs out the material to be delivered.

It is a further object of the instant invention to provide another embodiment of scale assembly for the aforementioned apparatus in which an extension member moves integrally with the bucket assembly in response to merchandise deposited therein and is provided with a magnet at its free end operatively associated with the switches; counterbalance forces are furnished by a pair of weighted rotatable bodies suspended by taut, non-twisting bands between the cantilever suspensions and immovable frame structure.

It is a further object of the instant invention to provide a further embodiment of scale assembly for said apparatus incorporating an arm member pivoted at one end from the stationary frame structure, which arm supports a magnet at its moving end operatively associated with said switches and which arm is also cantilever suspended intermediate its ends by a non-twistable band. The counterbalance structure also includes a pair of spring members suspended between cantilever suspensions and the stationary frame structure, the spring members providing opposing counterbalance forces, the aggregate of which is adapted to oppose the weight of the interconnected cantilever suspended structure. The magnet carrying end of the arm member is adapted to undergo a displacement corresponding to but larger than the displacement experienced by a bucket into which merchandise is deposited and thus provides a greater sensitivity and better regulation as the scale weighs out the material to be delivered.

Further objects and advantages of the instant invention will become apparent from the following description taken in conjunction with the figures, in which, FIG. 1 is a left-side elevation of feeding apparatus incorporating the improvements of the instant invention, which apparatus is adapted to weigh out and deliver in bulk predetermined quantities of merchandise;

FIG. 2 is a top plan of the embodiment shown in FIG. 1;

FIG. 9 is a right-side elevation of a particular embodiment of counterbalance structure for the scale assembly, and shows the adjacent portions of the bucket assembly;

FIG. 10 is a fragmentary, partially sectional, top plan view of the rotatable drum structure of the counterbalance structure taken along line 10—10 of FIG. 9;

FIG. 11 is a top plan of FIG. 9 cut off just to the rear of the weights suspended by the truss members of the bucket assembly;

FIG. 12 is a vertical elevation taken along the line 12—12 of FIG. 11;

FIG. 13 is a partly sectional, fragmentary, vertical elevation of the scale assembly switches taken along line 13—13 of FIG. 11 and shows the relative positions of the switches in respect to the magnet supporting arm of the counterbalance structure;

FIG. 14 is a fragmentary, side elevation of the magnet carrying end of the counterbalance arm;

FIG. 15A is a view of the glass switches showing schematically the operative ranges of the switches responsive to magnetic fields;

FIG. 16 is a right-side elevation of another improved embodiment of structure for the scale assembly adapted to be used with the feeding device of the instant invention;

FIG. 17 is a fragmentary and vertical elevation, partly in section, and taken along line 17—17 of FIG. 16;

FIG. 18 is a right-side elevation of still another improved embodiment of structure for the scale assembly adapted to be used with the feeding device of the instant invention;

FIG. 19 is a fragmentary and vertical elevation, in section, and taken along line 19—19 of FIG. 18; and FIG. 20 is a fragmentary, left-side elevation of structure for varying the counterbalance spring tension for the embodiment of FIG. 18.

Figure 3:
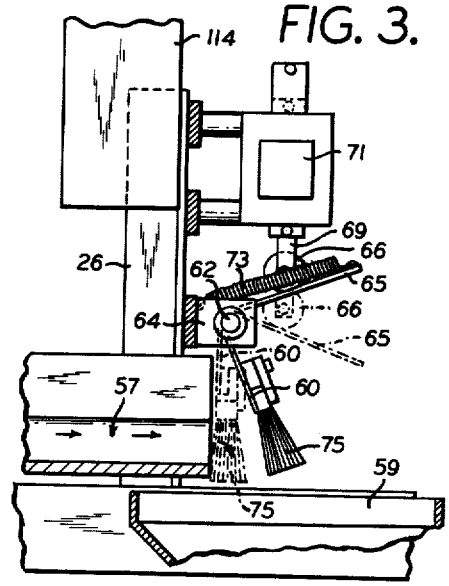
FIG. 3 is a fragmentary, vertical side elevation. partly in section, of the embodiment of FIG. 1, but taken along line 3—3 of FIG. 5.

FIGS. 1 and 2 illustrate a preferred embodiment of apparatus, a feeding device 25, incorporating the principles of the instant invention. Feeding device 25 is adapted to deliver weighed out batches of merchandise to packaging apparatus not shown herein. Feeding device 25 is supported by horizontal and vertical members defining a rigid frame structure 26. A hopper 27 is suspended over a longitudinal and horizontal trough 28 by vertical support members 29, two of which are shown along one side of hopper 27 in FIG. 2. It will be understood that another pair of members 29 are on the other side of hopper 27. Support members 29 extend rigidly from horizontal members 26a of rigid frame 26. Merchandise in bulk is poured into the top open end of hopper 27. Merchandise is released to trough 28 through an exit aperture 30 at the lower end of hopper 27. The size of aperture 30 may be varied by a slidable door 31. A tiltable chute 32 appears at the forward end of trough 28. The forward end of chute 32 communicates with the rearward end of a longitudinal and horizontal trough 33.

An electrical vibrator 34 imparts longitudinal back-and-forth vibratory motion to trough 28. Such motion causes the merchandise to flow toward the forward end of the trough and enter the rearward end of trough 33 via chute 32. Similarly, vibratory motion imparted to trough 33 causes merchandise to flow toward its forward end.

Vibrator 34 is mounted on four upright corner springs 35, two of which are shown along one side of the vibrator in FIG. 2. Springs 35 are secured to brackets 36. Brackets 36 are carried by frame structure 26. Springs 35 isolate vibration from the remainder of the apparatus. A longitudinal support platform 37 is attached to the underneath of trough 28. Support 37 has two spaced apart forward and rear lugs 23, 24 attached at 38a, 38b to vibrator 34. Support 37 maintains trough 28 in a horizontal position and also transmits vibratory motion from vibrator 34 to the trough. It will be understood that the lower end hopper 27 is suspended in proximity to but spaced from trough 28 so that vibratory motion of the latter is not hindered.

Chute 32 is suspended beneath the forward end of trough 28 by a transverse shaft 39 journalled in upright brackets 40. Brackets 40 are located along the opposite sides of trough 28 and are carried by rigid frame 26. An angled member 41 is anchored to the underneath of chute 32 and has a rearwardly extending horizontal arm 42. A counterbalance 43 is adjustably disposed on arm 42. A horizontal platform 44 is carried by frame structure 26. A vertical abutment stop 45 is supported at the rearward end of platform 44, and counterclockwise rotation of chute 32 is halted upon engagement of arm 42 with stop 45. The weight of the merchandise on tiltable chute 32 normally would cause the chute to turn clockwise, except that counterbalance 43 maintains chute 32 in counterclockwise position against stop 45, as shown in FIG. 2. In this position, the underneath of the forward end of chute 32 is spaced from the upwardly turned rearward end 46 of trough 33. If for any reason, the merchandise does not flow evenly along trough 33, a pile up will occur at the lower forward end of chute 32. This in turn will cause merchandise to back up on chute 32. Counterbalance 43 is positioned along arm 42 so that chute 32 turns clockwise only in response to the aggregate weight of piled up merchandise on chute 32. A pile up tilts chute 32 to bear against the upwardly turned end 46 to cause arm 42 to release a deflectible switch arm 47 of a switch 48 also supported by platform 44. Switch 48 is in the electrical circuit of vibrator 34 and shuts off vibrator 34 when arm 47 is released for extreme clockwise position of chute 32 to stop additional flow of merchandise to the chute. An operator now may correct the situation or allow the apparatus automatically to correct itself.

The longitudinal back-and-forth vibration imparted to trough 33 prevents merchandise from becoming permanently lodged between the underneath of chute 32 and inclined end 46 of trough 33 during operation of feeding device 25. Counterbalance 43 is adjustably disposed along arm 42 to adjust for the different weights of various types of merchandise so that trough vibration stops at pile ups of less dense merchandise as well as highly dense merchandise. The less dense the merchandise, the closer counterbalance 43 is located to the fulcrum of chute 32. It should be understood that chute 32 is so disposed that all merchandise released by trough 28 is received by the chute. However, the chute assembly is spaced a sufficient distance from trough 28 to avoid interference with vibratory motion of the trough.

A supporting member 54 is attached to the underneath of trough 33 and suspends the latter horizontally and serves to transmit longitudinal vibratory motion thereto. Member 54 has depending spaced apart lugs 49 secured to a vibrator 50. Vibrator 50 is carried by a horizontal support 51, which in turn is supported by corner springs 52. The lower ends of springs 52 are secured to brackets 53; brackets 53 are supported by frame structure 26.

Referring now to FIGS. 1 through 5A, trough 33 is partitioned by an inverted V-shaped divider 55. Divider 55 extends longitudinally substantially parallel to the upright side walls of trough 33, but is spaced closer to one of the side walls, such as 56, to define a relatively wide main trough 57 and a narrower auxiliary trough 58. Upright wall 56 and the confronting inclined wall of divider 55 are angularly spaced apart approximately 45 degrees to form in cross-section a relatively narrow V-shaped auxiliary trough 58. Divider 55 starts at a convenient distance from the forward end of chute 32 and terminates at the forward feeding ends of troughs 57, 58.

In a manner to be described hereinafter, it will be seen that the scale assembly of feeding apparatus 25 is designed to weigh out a preselected or designated weight of merchandise. A bucket 59 is suspended below the forward end of trough 33 to receive merchandise as it leaves the trough assembly. The greater portion of the merchandise fed to the bucket assembly flows along main trough 57. Only a small portion of the merchandise flows along auxiliary trough 58. As the contents of bucket 59 approach the preselected weight, flow from main trough 57 is stopped by a pivoted door 60. From this moment on, auxiliary trough 58 is permitted to feed merchandise to an auxiliary bucket 78 suspended in the interior of bucket 59. Auxiliary trough 58 is permitted to feed merchandise at a uniform rate until the aggregate weight of merchandise deposited in both buckets reaches the weight designated for delivery, whereupon vibrators 34, 50 are shut off. Deenergization of vibrators 34, 50 prevents further flow of merchandise to the buckets.

The relatively narrow V-shaped trough 58 aligns merchandise substantially in single-file fashion. As a result, the merchandise is released from the feeding end of trough 58 in a uniform continuous dribble flow. The narrow V-shaped cross sectional dimension of trough 58 prevents twisting, turning, and athwart alignment of the merchandise as it is propelled by vibration along the trough; it avoids pile ups and assures a continuous dribble flow to the auxiliary bucket. For twist pretzels, individually wrapped merchandise, such as hard candies, in particular, auxiliary chute 58 provides a uniform dribble of one piece of merchandise at a time. The uniform dribble flow in cooperation with the scale assembly to be described hereinafter provides a degree of control of the feeding operation which leads to the desirable result of substantially eliminating overweight supply of merchandise to the buckets.

As noted hereinbefore, merchandise flow from main trough 57 is halted by pivoted door 60. Door 60 is designed to swing across the forward feeding end of main trough 57 and bar further merchandise flow therefrom. On the other hand, merchandise flow from auxiliary trough 58 is permitted to subsist during vibration of trough 33. A pivotal deflector 61 is suspended juxtaposed the forward feeding end of auxiliary trough 58. Door 60 and deflector 61 are suspended from respective shafts 62, 63. Shafts 62, 63 are journalled at their respective ends in brackets 64 supported from rigid frame structure 26. Door 60 has a forwardly projecting cam surface 65 adapted for depressible engagement by a cam follower wheel 66. An upper surface 67 of deflector 61 is adapted to serve as the cam surface for depressible engagement by a cam follower wheel 68. Each cam wheel, 66, 68 is carried by respective solenoid plungers 69, 70 of a pair of solenoids 71, 72. Solenoids 71, 72 are suspended from frame structure 26. A pair of springs 73, 74 are suspended between door 60, deflector 61, respectively, and frame structure 26. Springs 73, 74 bias the pivoted bodies for counterclockwise turning when the cam surfaces thereof 65, 67 are released by respective solenoid plungers 69, 70. Solenoid plungers 69, 70 rise when respective ones of solenoids 71, 72 are energized. Conversely, solenoid plungers 69, 70 drop when respective ones of solenoids 71, 72 are deenergized to effect clockwise turning of door 60 or deflector 61 to close position. Springs 73, 74 are not strong enough to overcome downward travel of respective plungers 69, 70.

Door 60 is provided with a depending bristol brush 75. Brush 75 is designed to extend across and shut the forward open end of trough 57 and bar further merchandise flow therefrom after door 60 swings to close position, as indicated in dashed outline in FIG. 3. Brush 75 is desirable when apparatus 25 feeds breakable or brittle merchandise. When door 60 is in open position, brush 75 is spaced from the open end of main chute 57, as illustrated in the full line outline of FIG. 3.

Figure 4:
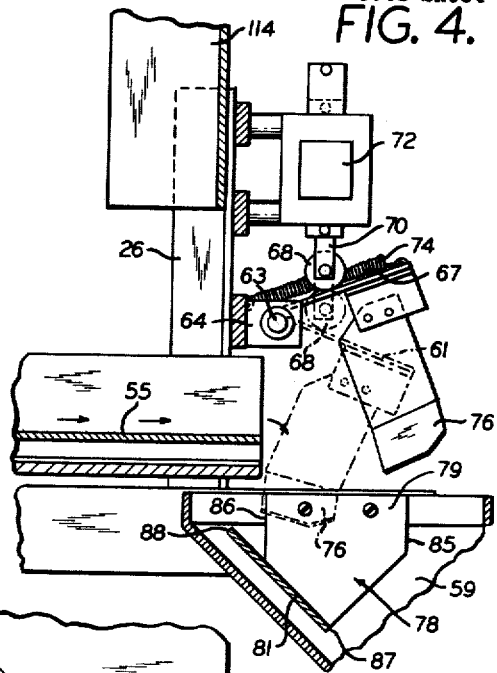
FIG. 4 is a fragmentary, vertical side elevation, partly in section, taken along line 4—4 of FIG. 5.
Figure 5:
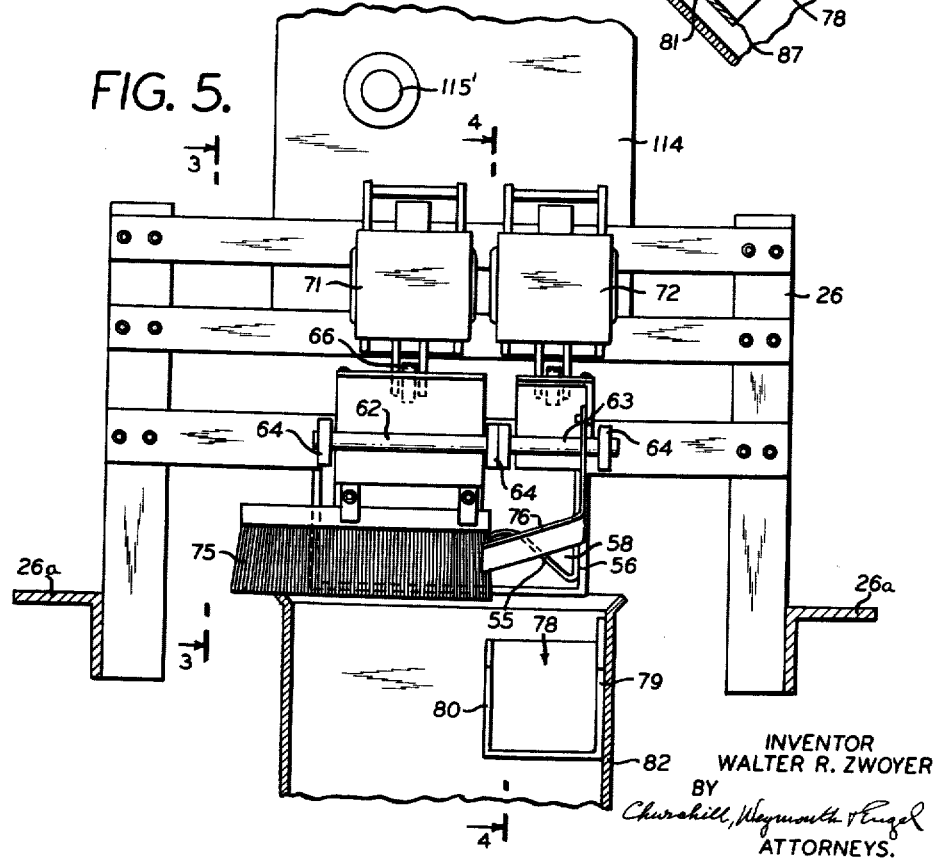
FIG. 5 is a fragmentary, end view elevation of the apparatus taken along line 5—5 of FIG. 1, but illustrates the pivotal door and deflector mechanism in open positions and also shows the bucket assembly operatively associated with the feeding ends of the troughs.

Deflector 61 has a lateral blade 76 at its lower end. Blade 76 is adapted to swing into the path of flight of dribble flow from trough 58. The dribble flow intended for auxiliary bucket 78 is deflected into the main vessel area of bucket 59 when deflector 61 swings clockwise to close position, as shown in dashed lines in FIG. 4. The arrows in FIGS. 3 and 4 show the direction of merchandise flow.

The remainder of feed device 25 including bucket assembly constitutes the scale assembly which now will be described. Reference is now made to FIGS. 4 through 10 for the bucket assembly. The bucket assembly has an auxiliary bucket 78 suspended within main bucket 59. Auxiliary bucket 78 is made up of a bracket member provided with spaced-apart opposed vertical walls 79, 80 joined by a lateral member 81. Lateral member 81 extends across and below trough 58 and in close spaced relationship thereto. The first vertical wall 79 is anchored, for example, by bolts to bucket side wall 82. The second vertical wall 80 is suspended in bucket interior and spaced from bucket side wall 82. The forward and rearward edges 85, 86 of walls 79, 80 are substantially vertical at the upper portions thereof. Edges 85, 86 converge at an apex 87 at the lower portions thereof. Lateral member 81 lies in the plane of the inclined rearward edges 86 and has an upper end 88 which projects rearwardly beyond the feeding end of trough 58 to catch the undeflected dribble flow of merchandise released thereby. Vertical wall 80 also prevents dribble flow intended for auxiliary bucket 78 from flowing into the area of main bucket 59.

A rockable door 89 (FIG. 7) cooperates with bracket member 79, 80 to complete auxiliary bucket 78. Door 89 has a vertical upper section 90 and an inclined lower section 91. Lower section 91 is shaped and disposed to fit between vertical walls 79, 80 to complete the bucket structure formed thereby. Door 89 is suspended from a shaft 92. Shaft 92 is journalled at its ends in opposed brackets 93 carried by the opposite side walls of bucket 59. An upwardly projecting arm 94 is also secured to shaft 92. Arm 94 is biased by a spring 95, which spring is fixed at its other end to a lateral upright member 96 suspended between the opposed side walls of bucket 59. Spring 95 biases door 89 for clockwise rotation. It will be understood that auxiliary bucket 78 serves to receive the dribble flow when deflector 61 is in open counterclockwise position. The uniform and substantially single-file dribble flow of merchandise travels a relatively short distance after it leaves trough 58, because auxiliary bucket 78 is suspended directly beneath and in close spaced relationship to trough 58. Consequently, the number of articles of merchandise at any one time in flight is minimized. This arrangement permits the scale assembly to weigh out accurately the weight desired for delivery and substantially eliminates overweight of merchandise in the bucket assembly.

When the weight of merchandise in bucket 59 reaches the preselected value, a pivotal dump door 97 at the forward end of bucket 59 is operated to open. It will be shown that the door 89 also opens at the same time to effect release of the merchandise in both buckets. It will be understood that packaging apparatus, not shown herein, may be located below bucket 59. Door 97 is suspended from a turnable shaft 99. Shaft 99 is journalled at its ends in bearing means provided by brackets 93 carried by the opposed side walls of bucket 59. A curved member 100 is secured to the exterior of door 97. Curved member 100 provides a concave cam surface for a cam follower wheel 101 carried by a follower arm 102. The forward end of arm 102 is secured to turn integrally with a turnable end 103 of a solenoid 104. When the merchandise deposited in bucket assembly arrives at the preselected weight, solenoid 104 is energized and causes turnable end 103 to rotate in a clockwise direction. Follower arm 102 swings along a clockwise arc and drives cam wheel 101 upward along the curved end of the cam surface of member 100 to open door 97. Door 97 is provided with an upwardly extending arm 105 provided with an arcuate hook end 106. When door 97 turns counterclockwise to open position, hook 106 engages arm 94 and pivots auxiliary bucket door 89 in a counterclockwise direction. Such action releases all merchandise deposited in the bucket assembly. Clockwise rotation of door 97 causes hook 106 to release arm 94, whereby biasing spring 95 shuts door 89 of auxiliary bucket 78. The relative positions of the door-bucket structure are shown for shut and open positions in FIGS. 6 and 7, respectively.

Turnable solenoid end 103 is biased by a spring 107 connected at its upper end to a lug 109. Lug 109 is suspended from a vertical member 110. Vertical member 110 is secured to the rearward face of an upright bracket plate 108. Spring 107 biases turnable end 103 and follower arm 102 to rotate in a counterclockwise direction to shut simultaneously bucket doors 89, 97 upon deenergization of solenoid 104.

A switch 111 is suspended from member 110. Switch 111 is provided with a deflectible arm 112. A wheel 113 is suspended at the end of a deflectible arm 112. It will be seen from the discussion of FIG. 15, the electrical circuit of feeding device 25, that switch 111 is in the circuit of vibrators 34, 50 and in the circuit of solenoids 71, 72. Deflectible arm 112 is normally depressed by follower arm 102 when door 97 is shut. For open door position, follower arm 102 releases deflectible arm 112. This action causes switch 111 to open the electrical circuits of the solenoids 71, 72 and vibrators 34, 50. Accordingly, operation of switch 111 insures that deflector 61, door 60 are held in clockwise shut position and that vibrator 34 and, in particular, vibrator 50 are shut off to prevent further release of merchandise from trough 33 into the bucket assembly during the time the weighed out quantity of merchandise is being released by the bucket assembly. When door 97 returns to its shut position, follower arm 102 deflectibly depresses switch arm 112 to activate switch 111.

FIGS. 9 through 14 illustrate one preferred embodiment of a counterbalance mechanism for the scale assembly. Bucket 59 is suspended from the rearward ends of a pair of spaced apart truss mmebers 120 anchored, such as by bolts, to the opposite side walls of bucket 59. The forward ends of truss members 120 are anchored to the opposite side edges of bracket plate 108. Bracket plate 108 is suspended such as by bolts from the rearward unrestrained ends of four spaced apart longitudinally extending, non-twisting and flexible suspension arms 121. The forward ends of respective arms 121 are secured such as by bolts to respective posts 122 carried at the corners of an upright frame plate 123. Plate 123 is integrally attached to a horizontal support platform 124. Platform 124 in turn is supported by brackets 125 which are integral with frame structure 26. Arms 121 serve as a cantilever suspension from which bracket plate 108, truss members 120 and bucket 59 are supported. Known measuring weights 126 are nested in a weight support 127 suspended substantially horizontally from truss members 120 by bolts as shown in the figures.

Since frame 26 is a stationary reference, all structure directly or indirectly anchored thereto remains relatively fixed and immovable. On the other hand, the structure suspended from the unrestrained ends of cantilever arms 121 is adapted to move along a substantial vertical path in response to changes of weight to the bucket assembly. Movement is downward for weight increases and upward for a decrease in weight. The weight of the bucket assembly may be varied by removal or addition of fixed weights 126, or by varying the quantity of merchandise contained in buckets 59, 78. The movable structure comprises the interconnected elements such as bracket plate 108, truss members 120, weight support 127 and its weights 126, and the bucket assembly.

A pair of spaced apart upright support columns 128 are carried by platform 124 adjacent the forward face of bracket plate 108. A transverse bar 129 is anchored to the tops of columns 128. Two spaced apart vertically extending springs 130 are suspended from the ends of bar 129. The upper ends of springs 130 hook to respective ones of a pair of studs 131, which studs 131 may be threadedly secured to bar 129. The lower ends of springs are fastened to forwardly extending studs 132 integral with the lower portion of movable bracket plate 108. The position of plate 108 may be regulated by adjustment of threaded studs 131.

A rotatable cylindrical-shaped drum 133 is suspended between bar 129 and bracket plate 108 by a pair of relatively flexible, taut and non-twistable spring bands 134, 135. Spring band 134 is anchored at its upper end 136 to a forwardly projecting stud 137 integral with bar 129. The lower portion of band 134 at 138 is contiguous with a segment of the forward side of the peripheral surface 139 of drum 133. Band 134 is anchored at its lower end 140 to peripheral surface 139. Band 135 is anchored at its upper end 141 to the rearward side of peripheral surface 139. The upper portion of band 135 at 142 folds against a segmental portion of peripheral surface 139 of drum 133. Band 135 continues downwardly until secured at its lower end 143 to movable bracket plate 108. The ends 140, 141 of bands 134, 135, the points of anchorage to drum 133, are substantially diametrically opposite one another. Bands 134, 135 have a rectangular shaped cross-section as seen best in FIG. 10. The horizontal cross-sectional dimension (FIG. 10), is thin. The vertical cross sectional dimension as seen in FIG. 10, particularly for band 135, is less than the vertical dimension of drum peripheral surface 139.

Bracket plate 108 is provided with two spaced apart forwardly projecting upright ribs 144, FIG. 10. Ribs 144 are disposed along the opposite sides of band 135 and provide vertically extending bearing surfaces 145. The exposed peripheral surface 139 on either side of band 135 is caused to bear positively against surfaces 145. Weight changes to the bucket assembly which result in movement of plate 108 cause drum 133 to shift vertically as it rotates about its axis 118. Rotation is clockwise for a weight increase to the bucket assembly. Upper end 136 of band 134 may be off-set rearwardly at least one-eighth of an inch from a true vertical to insure that drum 133 bears positively against surfaces 145 at all times including during drum movement. The true vertical would be an upright tangential line extending from the forwardmost edge of peripheral surface 139. The dashed line in FIG. 9 spaced from band 134 by an angle "a" illustrates the off-set. The off-set is exaggerated in the figure for clarity. Similarly, band 135 also may be off-set by an angle "a" from a true vertical. The engagement of drum 133 with bearing surfaces 145 prevents movement of member 147 along an axis normal to the path of travel.

A counterbalance 146 is adjustably disposed on a longitudinally extending arm 147. Weight 146 may be positioned along arm 147 and held thereto by screws or bolts 119. A pair of opposed links 148, 149 (FIG. 10) are secured such as by bolts to the sides of arm 147. The opposite end walls 150 of drum 133 are recessed to receive respective links 148, 149. Links 148, 149 are secured such as by bolts to drum end walls 150 so that arm 147 rocks integrally with movement of drum 133 as the latter rotates and shifts in response to weight changes to bucket assembly. A magnet holder 151 is anchored at the forward end of arm 147. A cylindrical shaped permanent magnet 152 is carried in an internal bore in holder 151. Holder 151 is disposed so that magnet 152 projects between two adjacently spaced apart housings 153, 154 having flat forward surfaces bearing slidably against the rearward surface of frame plate 123. Magnet 152 sweeps through an arc of a circle defined by the radially moving arm 147 pivoted at the center of drum 133. Since the arc swept by magnet 152 is relatively short, the path of travel of magnet may be considered to be substantially a straight line. The length of magnet 152 travel is a function of the length of arm 147 and tangent $\theta$, where $\theta$ is the angular displacement of drum 133 in response to bucket movement. By making the length of arm 147 relatively long, a very small displacement of bucket 59 is amplified by reason of a correspondingly larger displacement of magnet 152. Such mechanical amplification provides extremely sensitive and accurate switch regulation in order to weigh out for delivery preselected quantities of merchandise as small as three ounces.

Each housing 153, 154 supports an upright glass-encased switch 155, 156 provided with respective pairs of longitudinal arms 157 to 160. Switch arms 157 to 160 are firmly secured at the opposed ends of the glass envelope 117 and extend exteriorly therefrom to define terminal lugs 161 for electrical connection. The juxtaposed ends of switch arms 157 to 160 terminate approximately midway in the interior of the glass envelope 117 of switches 155, 156 to define open-close conductive contact points 162, 163. One arm of each switch 155, 156 responds to a magnetic field by deflecting in a direction to open and close contact points 162, 163. The location of the magnetic field in respect to arms 157 to 160 determines whether deflection is in a direction to open or close contact points 162, 163. It is seen that switches 155, 156 and magnet 152 are mutually oriented so that magnet 152 travels along a path substantially parallel to the longitudinal dimension of switch arms 157 to 160, while the axial dimension of magnet 152 is substantially perpendicular to the longitudinal dimension of switch arms 157 to 160.

Switches 155, 156 of the illustrated embodiment are known in the art as glass switches. Glass switches are characterized by holding contact points 162, 163 conductively closed when the adjacent ends of magnet 152 are juxtaposed and within the range of switch arms designated as "A" in FIG. 15A. There are two "A" regions for each switch 155, 156 on either side of a centrally disposed "B" region. When the juxtaposed end of magnet 152 enters into and sweeps through the small range of "B" region, on either side of the mid-section of the switch, the deflectible arm thereof responds by opening contact points 162, 163 and maintaining same open so long as the end of magnet 152 remains juxtaposed the "B" region. In addition, the glass switch is also characterized by responding accurately to the moving magnet 152 by causing contact points 162, 163 to open when magnet 152 arrives at a predetermined position in respect to each switch during upward travel. The predetermined position for each switch is illustrated as line "C" in FIG. 15A. Continued upward travel of magnet 152 past line "D" of respective switches will close contact points 162, 163. Experience with glass switches has confirmed that the point of circuit break, i.e., open contact points, is substantially fixed and will occur whenever the upwardly moving magnet 152 arrives at the predetermined position defined by line "C." Conversely, downward magnet travel past line "C" will close switch contact points.

In operation, magnet 152 is disposed relative to switches 155, 156 so that contact points 162, 163 are normally conductively closed at the beginning of the cycle of operation. For this condition, magnet 152 is positioned at 164, shown schematically in FIG. 15A. When the bucket assembly is filled with merchandise weighing a preselected amount less than that to be delivered, it is desired that switch 155 respond by opening of its contact points 162. Subsequently, when the aggregate of merchandise deposited in the bucket assembly is substantially the weight to be delivered, it is now desired that switch 156 respond by opening of its contact points 163. Accordingly, switch 155 will be disposed along the path of magnetic travel so that the upwardly travelling magnet 152 arrives juxtaposed circuit breaking point "C" in respect to switch 155 slightly before it reaches the corresponding circuit breaking point "C" for switch 156.

Switch housings 153, 154 are disposed to bear against and to slide along the rearward surface of frame plate 123 by being threadedly suspended by respective ones of longitudinally extending threaded studs 165, 166. Studs 165, 166 are held vertically upright by upper and lower guides 167, 168 anchored to frame plate 123. Guides 167, 168 are provided with through bores 169, 170 which permit studs 165, 166 to turn freely therein. Studs 165, 166 may be locked against rotation by usual means such as a pair of nuts below guides 168. Housings 153, 154 may be individually raised or lowered by threadedly adjusting respective ones of a pair of worms 171, 172. It is desirable to choose worm parameters such that a large angular displacement of worms 171, 172 effects a small vertical displacement of respective housings 153, 154.

Adjustment of counterbalance 146 along arm 147 will shift magnet 152 vertically in respect to switches 155, 156. Accordingly, the path of magnet travel of magnet may be raised or lowered by advancing counterbalance 146 toward drum 133 or toward the switches. By judiciously positioning counterbalance 146 along arm 147 and properly establishing the respective positions of switch housings 153, 154, magnet 152 will first arrive at circuit breaking point "C" for switch 155 at a weight slightly less than the weight of merchandise to be delivered during its upward travel in response to downward movement of the bucket assembly as merchandise is being deposited therein. Subsequently magnet 152 will arrive at circuit breaking point "C" for switch 156 when the aggregate weight of merchandise in buckets 59, 78 is substantially equal to the designated weight of merchandise to be delivered.

Figure 6:
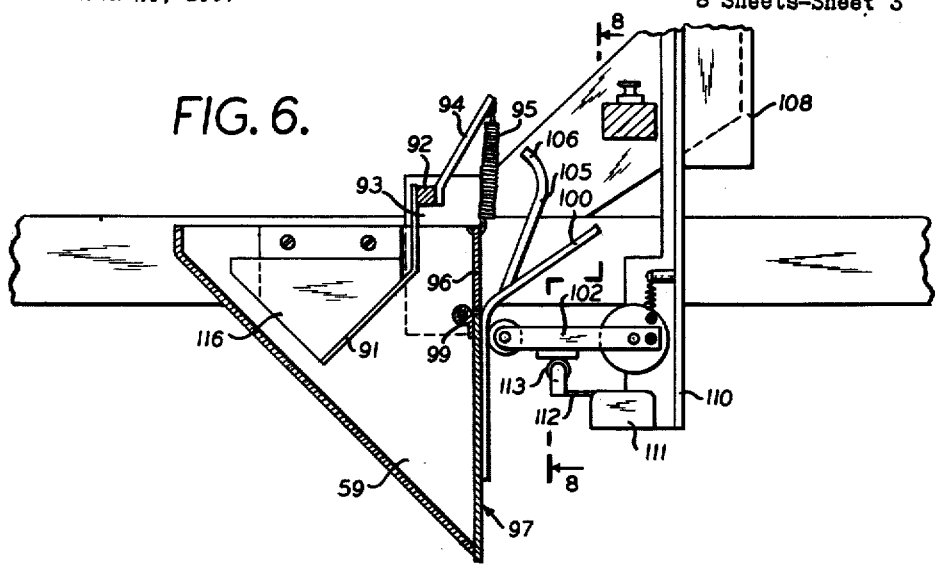
FIG. 6 is a fragmentary, sectional, side elevation of the bucket assembly taken along line 6—6 of FIG. 2 and shows the dump doors in shut position.
Figure 7:
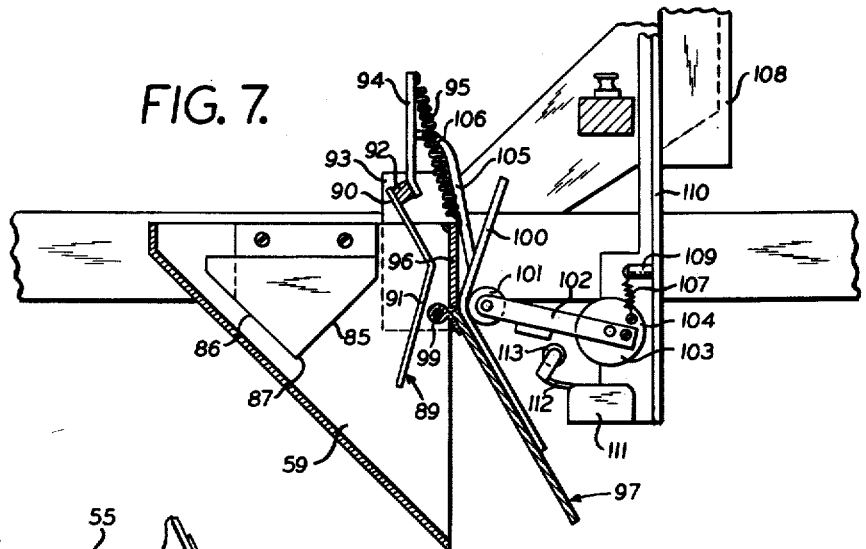
FIG. 7 is a same view of the elements shown in FIG. 6 with the dump doors in open position.
Figure 5A:
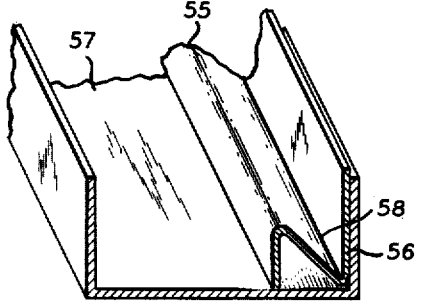
FIG. 5A is a fragmentary, perspective view of the feeding troughs taken along line 5A—5A of FIG. 2.
Figure 8:
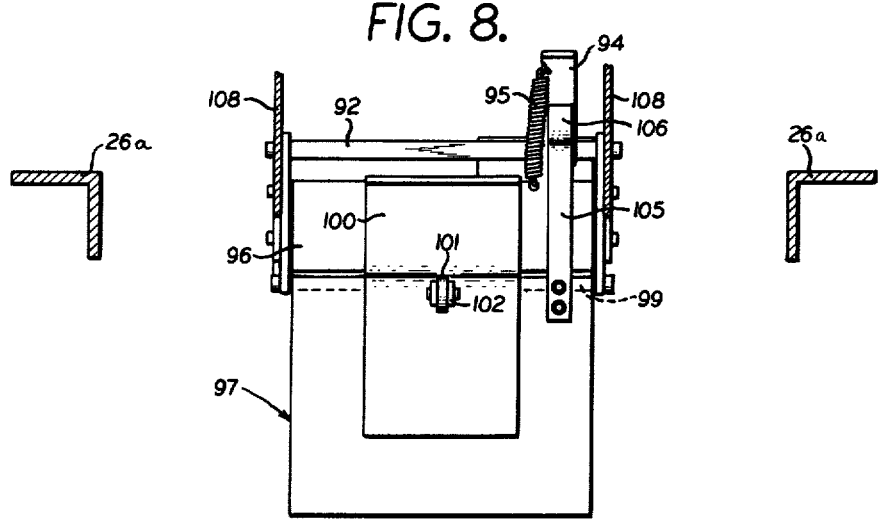
FIG. 8 is a fragmentary, partly sectional and end view elevation of the bucket structure taken along line 8—8 of FIG. 6.
Figure 15:
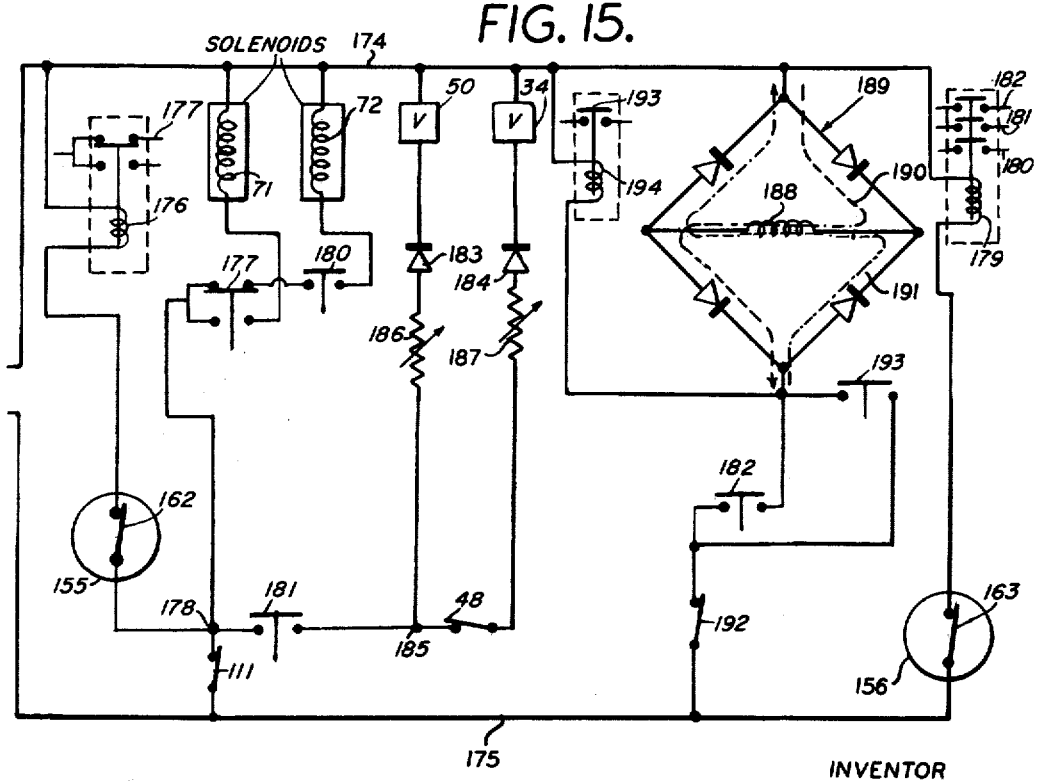
FIG. 15 is a schematic view of the electrical circuit of the feeding device.

FIG. 15 illustrates the electrical circuit for feeder apparatus 25. The circuit will be described by tracing one cycle of operation of apparatus 25. For the purpose of description, it will be assumed that the cycle of operation starts with an empty bucket assembly. The circuit includes an alternating current source 173, such as 110 volts, connected across bus bars 174, 175. A coil 176 of a relay switch 177 is conductively connected to bus bar 174 and is in series conductive relationship with switch 155. The other side of switch 155 is conductively connected to a terminal 178. Terminal 178 is conductively connected to one side of switch 111. Switch 111 is responsive to operation of dump door 97 as shown in FIGS. 6, 7. The other side of switch 111 is connected to bus bar 175. Relay switch blade 177 serves as a single pole, double throw switch and when thrown to the left, blade 177 conductively connects the coil of solenoid 71 from bus bar 174 to terminal 178. One end of a relay coil 179 of a second relay switch 180–182 is conductively connected to bus bar 174. The other end of coil 179 is conductively connected in series relationship with switch 156. The other side of switch 156 is conductively connected to bus line 175. Relay 180–182 is provided with three ganged switch blades 180, 181 and 182. Relay 180–182 serves as a triple pole, single throw switch. Blade 180 of ganged relay is conductively connected in series with the coil of dribble solenoid 72. When blade 180 is closed and when switch blade 177 is thrown to the right, dribble solenoid 72 is conductively connected from bus bar 174 to terminal 178. Vibrators 34, 50 are individually connected to bus bar 174 and in series relationship with respective half wave rectifiers 183, 184. Vibrator 34 is conductively connected in series with switch 48. Both vibrator circuits are brought together at a terminal 185. Terminal 185 is conductively connected in series to blade 181 of the ganged relay. When blade 181 is closed, it connects the vibrator circuits to terminal 178. Both vibrator circuits may contain variable rheostats 186, 187 in order to vary the rectified output current flow through vibrators 34, 50, which in turn regulate the intensity of vibration.

The coil 188 of rotary solenoid 104 is connected as the load of a bridge rectifier 189, for example, a selenium bridge rectifier. Arrows 190, 191 show electron flow through load 188 for each half cycle of A.C. input. One input side of bridge recitfier 189 is conductively connected to bus bar 174. The other input side of bridge rectifier 189 is conductively connected in series with blade 182 of the ganged relay switch. A master switch 192 is conductively connected in series with blade 182. The other side of master switch 192 is connected to bus bar 175. A third relay switch 193 is provided with a relay coil 194. Relay coil 194 is conductively connected across bridge rectifier 189. Relay blade 193 serves as a single pole, single throw switch and is conductively connected across blade 182 of the ganged relay.

In establishing the predetermined quantity of material to be weighed out and delivered, the scale assembly is balanced or assumes a predetermined null position by known weights 126. The delivered merchandise will equal the amount of known weights 126 removed from cantilever suspension. Upon such removal, the scale is thrown out of balance or displaced from its predetermined null position and ultimately brought back into balance by the deposit of merchandise in the bucket assembly equal in weight to the amount of known weights 126 removed. Consider the example of weighing out 10 ounces of merchandise. Known weights 126 of at least 10 ounces nest in weight support 127. Bucket assembly is emptied of all merchandise. Arm 147 pivots so that magnet 152 rises to its highest point along its path of travel. Counterbalance 146 and switch box 156 are adjusted so that magnet 152 is juxtaposed break circuit point "C" of switch 156. The scale is now balanced. The point of shutting off feed from main trough 57 and continuing feed only from auxiliary trough 58 is determined next. A small amount of weight is removed from weight support 127, for example, one half ounce. This drops magnet 152. Switch 155 is then aligned with magnet 152 so that the latter is juxtaposed break circuit point "C" for switch 155. The established positions of switches 155, 156 are such that switch 155 is slightly lower than switch 156, the differential representing the one half ounce. When the scale is in balanced condition, it is desirable to have contact points 162, 163 conductively closed. The position of switch 155 now may be checked for this requirement. If the differential of one half ounce is too great, a smaller differential may be used. For certain types of merchandise such as pretzel sticks, a differential of only $30/100$ of an ounce has been used which amounts to approximately three pretzels deposited in auxiliary bucket 78. Nine and one half ounces are then removed from weight support 127 which drops magnet 152 to start position. In this position, magnet 152 should be juxtaposed range "A" for both switches 155, 156 so that contact points 162, 163 are closed.

Often it is desirable that switch 156 open just before the aggregate in the bucket assembly reaches the weight to be delivered to compensate for a small amount of dribble flow still in flight at the time magnet 152 reaches break circuit point "C" for the switch 156. This amount of lead may be determined by a few test runs. Feeding apparatus 25 is now in condition for operation.

As noted hereinbefore, contact points 162, 163 of switches 155, 156 are closed at the start of the cycle of operation. Buckets 59, 78 are empty. Door 97 is shut and switch 111 is closed. Consequently, relay coils 176 and 179 are energized. Blade 177 of the first relay, and the ganged blades 180, 181 and 182 of the second relay, respond to energization of respective relay coils 176, 179 by being thrown to the left. Master switch 192 at this time is open. Solenoid 71 is energized. Hence door 60 across main trough 57 is open. Since blade 177 is in the left position, dribble solenoid 72 is not energized. Deflector 61 is in its clockwise deflecting position to prevent deposit of dribble flow in auxiliary bucket 78. Vibrators 34, 50 are energized and propel merchandise to bucket 59. Rotary solenoid coil 188 is not energized because both switches 182, 192 are open. As merchandise is fed by troughs 57, 58 to bucket 59, magnet 152 rises and arrives at the first predetermined position, circuit break line "C" of switch 155. Switch 155 opens. This deenergizes relay coil 176 and causes blade 177 to swing to the right and energize dribble solenoid 72. Solenoid 71 is no longer energized. Door 60 shuts whereas deflector 61 pivots out of line of flight of dribble flow, which flow now deposits into auxiliary bucket 78. Auxiliary bucket 78 will continue to receive dribble flow until the aggregate weight in the buckets substantially equals the weight to be delivered. Coil 179 of the ganged relay is still energized. When magnet 152 arrives at circuit break line "C" of switch 156, contact points 163 open. Relay coil 179 is deenergized. Blades 180 and 181 are thrown to the right and open respective circuits, thereby deenergizing dribble solenoid 72 and both vibrators 34, 50. In addition, blade 182 of the ganged relay in the circuit of solenoid coil 188 closes. Solenoid coil 188 remains unenergized because master switch 192 is not yet closed. Master switch 192 is closed to effect delivery of the deposited merchandise when the packaging apparatus is ready to receive same. Master switch 192 may be manually operated or automatically timed to accommodate the operation of package apparatus. When switch 192 closes, solenoid coil 188 is energized and opens dump doors 89, 97. Switch 111 also opens to assure that vibrators 34, 50 are not accidently energized while merchandise is being delivered by the bucket assembly. In addition, relay coil 194 is energized which causes switch blade 193 to close, thereby providing a shunt across blade 182 to assure continued operation of solenoid 104, even though blade 182 will soon open.

As the contents pour out of the bucket assembly, bucket 59 rises. Magnet 152 withdraws from region "B" of switch 156 which causes contact points 163 to close and reenergizes coil 179. Ganged blades 180, 181 and 182 move back to the left. Consequently, switch 182 is open; thus, the need for a shorting switch 193. Vibrators 34, 50 still remain shut off because door 97 is open, hence, switch 111 remains open. Dump door 97 will remain open as long as solenoid coil 188 is energized. As magnet 152 continues to drop with further delivery of merchandise, magnet 152 enters region "A" of switch 155. Contact points 162 now close to re-energize the first relay coil 176 which throws blade 177 into circuit of solenoid 71 in preparation for the next cycle of operation. In addition, it will be noted that the ganged switches 180, 181 and 182 have been returned previously to their initial position for the next cycle of operation. Magnet 152 returns to its starting position upon delivery of all the merchandise. However, rotary solenoid 104 remains energized because master switch 192 is still closed. Switch 192 remains closed until it is manually released or automatically opened in accordance with a timer accommodating operation of the packaging apparatus. When switch 192 opens, doors 89 and 97 close because solenoid coil 188 is deenergized. In addition, switch blade 193 opens and switch 111 closes. The circuit is now prepared for another cycle of operation.

It has been seen that switches 155, 156 operatively respond to movement of magnet 152 as the latter assumes successive positions along its path of travel. Consequently spurious oscillations or other movements to magnet 152 are undesirable. Vertical oscillations are eliminated by a hydraulic shock absorber 195 provided with a tank 196 anchored to a forwardly projecting angle arm 197 held by transverse bar 129. A piston-carrying shaft 198 of shock absorber 196 is suspended from movable bracket 108. Spurious movements to arm 147 along its longitudinal axis are prevented by the foregoing described structure which holds drum 133 at all times positively against bearing surface 145. Rotation of magnet 152 about a vertical axis is prevented by bands 134, 135 which hold the drum against the vertical face of plate 108 and which prevents twisting of drum 133.

It would be within the scope of the instant invention to employ circuits other than that shown in FIG. 15. For example, it would be within the realm of the invention to interrupt merchandise feeding from troughs 57, 58 upon closing of switches 155, 156.

FIGS. 16 and 17 illustrate another embodiment of a weight balancing structure for the scale assembly. In these figures and those to follow, feeding apparatus components heretofore identified are designated by the same reference numbers. The forward ends of truss members 120 are anchored to the side edges of plate 108. Plate 108 is suspended from the rearward unrestrained ends of four cantilever arms 121 for vertical motion in response to weight changes in the bucket assembly as noted hereinbefore. The forward ends of arms 121 are secured to frame plate 123. Plate 123 is stationary because it is anchored to frame structure 26 via platform 124 and bracket 125. A longitudinally extending magnet supporting arm 200 is secured at its rearward end 201 to a forward projection 202 integral with plate 108. The forwardly extending end of arm 200 terminates with magnet holder 151 carrying magnet 152. Magnet 152 is suspended between switch housings 153, 154 containing switches 155, 156. The pair of columns 128 extend upright from platform 124 adjacent the forward face of plate 108. Transverse bar 129 is anchored to the tops of columns 128. In this embodiment it will be noted that magnet carrying arm 200 moves integrally with plate 108 and the bucket assembly. Accordingly, magnet 152 moves downwardly along a vertical path in response to deposit of material in buckets 59, 78. Since arm 200 is not pivoted, the instant embodiment does not provide mechanical multiplication at the magnet end of arm 200. The amount of displacement of magnet 152 is the same as the amount of the displacement of the bucket assembly. The path of travel of magnet 152 may be shifted by a pair of spaced apart, rotatable, weighted drums 203, 204.

The structural suspension for each drum 203, 204 is somewhat similar to the drum structure and counterbalance arrangement of the prior embodiment, except that the drum structure in the instant embodiment is not an integral part of the magnet carrying arm 200. Drums 203, 204 are suspended between transverse bar 129 and movable plate 108 by respective pairs of taut, non-twisting, flexible upper and lower bands 205, 206. The upper ends of bands 205 are anchored to forwardly projecting members 207 integral with bar 129. The lower portion of bands 205 folds contiguously against a segment of the forward side of peripheral surface 208 of respective drums 203, 204. Bands 205 are anchored at the lower ends 209 to the peripheral surfaces 208 of respective drums 203, 204. Lower bands 206 are anchored at upper ends 210 to the rearward side of peripheral surfaces 208 of respective drums 203, 204. The upper portion of bands 206 fold against a segment of the peripheral surfaces 208. Bands depend until anchored at the lower ends thereof 211 to movable bracket 108. The points of anchorage 209, 210 at the peripheral surfaces 208 of respective drums 203, 204 are preferably diametrically opposite. Each drum is provided wtih a longitudinal extending arm 212. Weighted counterbalances 213, 213' are adjustably disposed along respective arms 212. The rearward bifurcated ends 148, 149 of arms 212 are recessed in grooves disposed along the end walls 150 of drums 203, 204 and are anchored thereat, such as by bolts. Arms 212 turn integrally with drum rotation as the respective drums 203, 204 rotate about their transverse axes 214 in response to bucket movement. Downward motion of the bucket assembly causes drums 203, 204 to rotate clockwise because the upper ends of bands 205 are attached to stationary bar 129, whereas lower ends 211 of bands 206 are attached to movable plate 108.

Switches 155, 156 operatively respond to movement of magnet 152 as noted hereinbefore, except that switch 155 is now positioned above switch 156 because magnet 152 starts the cycle of operation at the top of its path of travel. The vertical displacement between switches 155, 156 corresponds to the half-ounce differential noted in the foregoing illustrative example. The predetermined positions assumed by magnet 152 are the following. Switch contacts 162 open when magnet 152 reaches line "D" for switch 155. Door 60 shuts, deflector 61 pivots to open position and dribble deposits in auxiliary bucket 78. Contacts 163 open when magnet 152 reaches line "D" for switch 156. Vibrators 34, 50 are shut off and the bucket assembly delivers the merchandise when solenoid 104 is energized. As noted hereinbefore, spurious oscillatory motion to magnet 152 may be eliminated by hydraulic shock absorber 195. Tank 196 of shock absorber 195 is suspended from a forwardly extending support 215 carried by trannsverse bar 129. The piston-carrying shaft 198 of shock absorber 195 is operatively anchored to movable bracket 108. Spurious longitudinal movements to arm 200 are substantially eliminated since arm 200 is integral with bracket plate 108. Rotation of magnet 152 about a vertical axis is substantially eliminated by the technique of suspending drums 203, 204 by bands 205, 206 which resist twisting.

FIGS. 18 through 20 illustrate another embodiment of counterbalance structure. Truss members 120 and bracket plate 108 are suspended from the free ends of cantilever arms 121 as noted hereinbefore. The forward ends of cantilever arms 121 are anchored to frame plate 123 as noted hereinbefore. A supporting bar 220 is carried at its rearward end by a forwardly projecting member 221. Member 221 is carried at its rearward end 222 by bracket plate 108. An upright, four-sided and hollow housing 223 is suspended from the forward end of bar 220. A relatively flexible, taut and non-twistable band 224 is secured to and depends from an upper edge 225 of housing 223. The lower end of band 224 is anchored to a magnet holding arm 226. Arm 226 is pivotally supported at its rearward end by a stationary bifurcated frame 227. Frame 227 is carried at its upper edge by a horizontal support 228 anchored to transverse bar 129. Transverse bar 129 is carried at the top ends of the pair of columns 128 standing upright from horizontal platform 124. Magnet 152 is suspended within magnetic holder 151 carried at the forward end of arm 226. A relatively heavy counterbalance spring 229 is suspended at its upper end from a stud 230 threadedly engaging transverse bar 129. Stud 230 may be locked in position by a nut 231. The lower end of spring 229 is cleared by a recess 232 in platform 124 and is tied to a forwardly extending stud 233 integral with bracket plate 108. A relatively lighter vernier counterbalance spring 234 is tied at its upper end 235 to projecting member 221. The lower end of spring 234 is tied to a lever 236. Lever 236 turns integrally with a pivoted member 237 about the axis of shaft 238. Shaft 238 is journalled in an upright bracket 239. Bracket 239 is anchored to horizontal platform 124. A long threaded stud 240 is supported to extend substantially horizontally by a threaded through bore 241 provided in a guide member 242. Gude member 242 is anchored to platform 124. A block 243 is attached to stud 240 and is spaced from the rearward side of guide 242. The attachment is such that block 243 does not hinder threaded rotation of stud 240 in respect to guide 242. Block 243 is adapted to slide along the upper surface of platform 124 toward spring 234 and away therefrom depending upon direction of threaded adjustment of stud 240. The forward end of stud 240 passes through a bore in frame plate 123 and carries at the exterior side thereof an adjusting knob 244. Slidable block 243 has a lateral rod 245 disposed to engage against a lever 246 extending aslant from turnable member 237. Member 237 is normally biased to turn clockwise as seen in FIG. 20 by spring 234 which causes lever 246 to bear against rod 245. Threaded adjustment of stud 240 in one direction carries slidable block 243 forward and allows member 237 to turn clockwise to decrease tension of spring 234. Threaded adjustment in the other direction increases spring tension. A pair of locking nuts 247 lock stud 240 in set position.

It will be noted that spring 234 applies a counterbalancing force in opposition to the counterbalancing force applied by spring 229 and the aggregate force may be adjusted to balance out the aggregate weight of the interconnected bucket assembly elements suspended from cantilever arms 121.

Loading of buckets 59, 78 causes forwardly projecting member 221 to move downwardly, which, in turn, carries housing 223 integrally therewith in a downward direction. The pivoting end of arm 226 does not move vertically because frame 227 is stationary. The weight of arm 226 causes it to pivot counterclockwise and magnet 152 to drop with downward movement of the bucket assembly. Switches 155, 156 are disposed along the path of travel of magnet 152 in a manner as contemplated in respect to the prior embodiment of FIGS. 16 and 17. Since arm 226 pivots at its rearward end in response to bucket movement, travel of bucket 59 or bracket plate 108 along a substantially vertical path is multiplied mechanically at the magnet end of arm 226 as a function of the length of arm 226. The path of travel of magnet 152 in respect to switches 155, 156 may be shifted by threadedly adjusting spring 229 or vernier spring 234.

Spurious vertical oscillations to magnet 152 are substantially eliminated by hydraulic shock absorber 195, the vessel 196 of which is suspended from a horizontal support 248 carried by transverse bar 129. The piston-carrying shaft 198 of shock absorber 195 is operatively connected to bracket plate 108. Spurious longitudinal displacements to magnet 152 are prevented by the fact that arm 226 is attached directly to frame 227 which, in turn, is attached to frame structure 26. Rotation of magnet 152 about a vertical axis is suppressed by the arrangement of pivoting arm 226 from stationary frame 227 and by virtue of suspension of the arm by a non-twisting band 224.

The various relays and other elements of the electrical circuit disclosed in FIG. 15, with the exception of switch 48, solenoid 104 and switch 111, may be suspended or mounted at a convenient place along frame structure 26, such as at panelboard 116, FIG. 1. Rheostats 186, 187 may be mounted in box 114 and regulated by respective turnable knobs 115, 115'. As noted hereinbefore, solenoid 104 and switch 111 are suspended from member 110, which member is part of the bucket assembly. The electrical conducting wires 199 (FIG. 9) connecting these two elements to the respective circuits therefor may be bundled and tied at convenient points along the movable scale structure, particularly along one of the arms 121 in order to provide an unvarying weighted load to the movable scale to prevent false readings or measurements.

Divider 55 may be removed from trough assembly 33 for a uniform and freely flowing product, such as coffee. For this arrangement it will be understood that a dribble feed between brush 75 and wall 56 continues after door 60 is closed. In addition, the auxiliary bucket 78 also may be removed, particularly when a large batch of material is being weighed. In such a situation, the upper surface of the deposited material is high up in bucket 59 and close to the feeding end of the trough assembly by the time the feed has been reduced to dribble flow so that the amount of dribble travel is short.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What I claim is:

1. Scale apparatus for weighing out and delivering a preselected weight of flowable material comprising, a relatively fixed frame structure, a plurality of cantilever arms having free ends, the other ends of said arms being fixed to said structure, a bucket suspended from the free ends of said cantilever arms and subject to movement in response to the deposit of material therein, said bucket being adapted to undergo alternate phases of operation wherein material is deposited into said bucket and weighed out by the scale during one phase of operation and wherein the weighed out quantity of material is delivered by said bucket during the other phase of its operation, a weighted drum suspended between said frame structure and said bucket, means mounting said drum for rotatable linear movement along the bucket, means tying said drum to said bucket, an extension member operatively associated with said bucket and experiencing movement corresponding to bucket movment, said extension member having a free end adapted for movement along a predetermined path of travel in response to bucket movement, said member at its other end being anchored to said drum so as to turn integrally therewith, whereby movement of said free end of said member along its path of travel is a mechanical magnification of bucket movement, there being a predetermined null position along the path of travel of said free end when said bucket contains a quantity of material substantially equal to the preselected weight, and switch means responsive to movement of the free end of said member whereby the flow of material deposited into said bucket is regulated by said switch means in response to successive positions assumed by said member as it moves along its path of travel.

2. Apparatus as defined in claim 1, further including a plurality of removable weights suspended from said cantilever arms and adapted to maintain said scale substantially at such predetermined null position when said bucket is empty, said preselected weight of material being predetermined by the amount of weights removed from the cantilever suspension.

3. A scale according to claim 1 having a feeding trough wherein said feeding trough includes main and auxiliary feed troughs having separate feeding ends arranged to deposit material into said bucket, said main trough being arranged to furnish a substantially greater quantity of material to said bucket in comparison to a dribble flow furnished by said auxiliary trough, an auxiliary bucket in the interior of the first-mentioned bucket wherein said auxiliary bucket is disposed directly under the feeding end of said auxiliary trough and in close spaced relationship thereto in order to receive the dribble flow therefrom, a deflector juxtaposed the feeding end of said auxiliary trough, said deflector being pivotable from one to another of two positions, said deflector being disposed in the path of flight of dribble flow from said auxiliarly trough for one of its positions to cause such flow to deflect into the vessel area of the outer bucket whereas said deflector is removed from the path of flight of dribble flow for the other of its two positions to allow same to flow into said auxiliary bucket such that the aggregate of the weighed out material deposited in the bucket assembly is the sum contained in said auxiliary bucket and said outer bucket.

4. A scale according to claim 3 further including, a pivotal door suspended at the feeding end of said main trough, an electrical circuit for operating said scale, a member experiencing movement corresponding to movement of the bucket assembly, said regulating means including a pair of switches the operation of which being responsive to movement of said member as it traverses successive positions along its path of travel in close proximity to said pair of switches, the first of said switches being conductively associated with the circuit of said pivotal door and said deflector and normally maintaining the said pivotal door open and said deflector disposed in the path of flight of dribble flow, the second of said switches regulating the flow of material along said feeding trough and being normally set to maintain such material flow, said first switch being disposed with respect to movement of said member such that switch operation closes said pivotal door and repositions said deflector to allow a dribble flow to deposit in said auxiliary bucket when said member reaches a position along its path of travel corresponding to a deposit in said outer bucket of a predetermined weight less than the preselected weight desired for delivery, said second switch being disposed along the path of travel of said member so as to complete the weighing out phase of bucket operation, wherein the flow of material along said feeding trough is halted and dribble flow is discontinued to effect an accurate deposit in the bucket assembly equal to the preselected weight desired for delivery.

5. A scale apparatus according to claim 1, wherein said means mounting said drum for rotatable linear movement along said bucket and said means tying said drum to said bucket, comprise a pair of relatively taut and non-twisting bands suspending the drum for rotation about its axial dimension in response to bucket movement, one end of the first band of the pair being attached to said frame structure above the axis of rotation of the drum whereas its other end is anchored to the peripheral surface of said drum, one end of the second band of the pair being anchored to the peripheral surface of said drum whereas its other end is anchored to said bucket below the axis of rotation of said drum, the points of anchorage of the bands along the peripheral surface of said drum being diametrically oppose.

6. Scale apparatus according to claim 5 wherein said drum being supported such that its peripheral surface slidably bears positively against a bearing surface to prevent spurious movement of said member along an axis substantially normal to the path of travel.

7. Scale apparatus according to claim 1 further including, spring means suspended between said cantilever arms and said relatively fixed frame structure and exerting a force counterbalancing the weight of said bucket.

8. Apparatus as defined in claim 1, further including, a hinged door for said bucket for releasing material contained therein, cam means and a cam follower operatively engaging said cam means for regulating the movement of said bucket door from open to shut positions, said follower being adapted to move from one to another of two positions in respect to said cam to hold said door positively open for one of said positions and positively shut for the other of said positions, and an electrical circuit including a solenoid for moving said follower between said two positions, said door being shut while material is being furnished to said bucket.

9. Apparatus for delivering a weighed quantity of flowable material comprising, a relatively fixed frame, a plurality of cantilever arms having free ends and other ends rigidly fixed to said frame, a feeding trough, a bucket suspended from the free ends of said cantilever arms and disposed under said trough, means for vibrating said trough to cause flow of material into said bucket, a hinged door for said bucket for releasing material deposited therein, a cam and cam follower means for regulating movement of said door, said follower being adapted to move from one to another of two positions in respect to said cam to hold said door positively open for one of said positions and positively shut for the other of said positions, said door being shut while material is being deposited into said bucket, and a switch responsive to door movement for shutting off said vibratory means while said door is open.

10. Scale apparatus for weighing out and delivering a preselected weight of flowable material furnished in bulk to said apparatus and comprising, a vibratory feeding trough for conveying flowable material, a bucket disposed under the feeding end and undergoing alternate phases of operation, during one of said phases material is deposited in said bucket until a preselected quantity is weighed out and during the other of said phases the material is delivered by said bucket, a switch responsive to bucket operation and adapted to shut off the vibratory feed during the bucket delivery phase of operation, a plurality of cantilever arms, said bucket being suspended for movement by the free ends of said arms in response to a deposit of material into said bucket, a member movable along a predetermined path of travel in response to bucket movement, there being a predetermined position along the path of travel of said member corresponding to the scale being in balance wherein, said bucket contains a quantity of material substantially equal to the preselected weight, and switch means for regulating the flow of material into said bucket as said member arrives at predetermined positions along its path of travel, said scale being out of balance when said member is displaced from said predetermined balancing position, and said member approaching said predetermined balancing position as said scale is progressively brought into balance by the flow of material into said bucket.

11. Apparatus as defined in claim 10, further including, a plurality of removable weights suspended from said cantilever arms and adapted to maintain said scale substantially in balance when said bucket is empty, said preselected weight of material designed to effect scale balance being determined by the amount of weights removed from cantilever suspension.

12. Apparatus for delivering a quantity of flowable material comprising, a plurality of cantilever arms having free ends, the other ends of said arms being in relatively fixed position, main and auxiliary feed troughs having feeding ends, a bucket suspended from the free ends of said cantilever arms, said bucket being disposed under said feeding ends and undergoing alternate phases of operation, during one of said phases said bucket being adapted to receive said material until a preselected quantity is weighed out and during the other of said phases to deliver the weighed out material, vibratory means causing material flow along said troughs, a switch responsive to bucket operation for maintaining said vibratory means shut off during delivery stage operation of said bucket, said main trough furnishing a substantially larger portion of material to said bucket in comparison to a dribble flow furnished by said auixliary trough, an auxiliary bucket suspended in the interior of said first-mentioned bucket and in close space relationship under the auxiliary trough feeding end to receive the dribble flow of material therefrom, said buckets being adapted to deliver material substantially simultaneously, the aggregate weight of the delivered material being a preselected weighed quantity, and a deflector member pivotally suspended juxtaposed the feeding end of said auxiliary trough, means pivoting said deflectors member from one one position to another of two positions, said deflector being disposed in the path of flight of material flow from said auxiliary trough for one of said positions to cause said material to deflect into the vessel area of said outer bucket and being removed from the line of flight of said material to allow the dribble flow from said auxiliary trough to be deposited in said auxiliary bucket for the other of said positions.

13. Scale apparatus for weighing out and delivering a preselected weight of flowable material furnished in bulk thereto comprising, main and auxiliary feeding troughs having respective feeding ends, vibratory means including an electrical circuit therefor causing flow of material along said troughs toward the feeding ends thereof, a relatively large bucket suspended under the feeding end of said main trough, an auxiliary bucket suspended in close spaced relationship under the feeding end of said auxiliary trough and adapted to receive the flow of material therefrom, a substantially larger portion of the material being fed by said main trough in comparison to a dribble flow furnished by said auxiliary trough, a pivotal door suspended at the feeding end of said main trough, an electrical circuit for operating said pivotal door, a pivotal deflector suspended at the feeding end of said auxiliary trough, an electrical circuit for operating said pivotal deflector, a plurality of cantilever arms, said buckets being suspended for movement from the free ends of said arms in response to deposit of material therein and being adapted to undergo alternate phases of operation, during one of said phases material is deposited into said buckets and weighted out, during the other of said phases the weighed out material is delivered by said buckets, a member adapted for movement along a predetermined path of travel in response to movement of said buckets, there being a predetermined position along the path of travel of said member corresponding to the scale being in balance, wherein said buckets contain a quantity of material substantially equal to the preselected weight, and a pair of switches for regulating the flow of material into said buckets as said member assumes successive predetermined positions along its path of travel, a first of said switches being conductively associated with the circuits of said pivotal door and said deflector and normally maintaining said pivotal door open and said deflector disposed in the path of flight of said dribble flow to cause such flow to deflect into the vessel containing area of said large bucket, the second of said switches being conductively associated with the circuit of said vibratory means to shut same off, said scale being out of balance when said member is displaced from said predetermined balancing position, said first switch being disposed at an other predetermined position along said path of travel corresponding to an aggregate weight less than said preselected weight, said movable member first arrives at said other predetermined position as said scale is progressively brought into balance by flow of material into said large bucket at which time operation of said first switch closes said pivotal door to bar further flow of material from said main trough and repositions said deflector to allow dribble flow into said auxiliary bucket, said second switch being disposed at said predetermined balancing position and said member subsequently arrives thereat to cause said switch to shut off said vibratory means.

14. Apparatus as defined in claim 13, further including, an electrical circuit having a solenoid, a relay switch in said solenoid circuit and responsive to the operation of said second switch, and a master switch in said solenoid circuit, arrival of said member at said predetermined balancing position causes said second switch to close said relay switch to allow operation of said solenoid, actuation of said master switch energizing said solenoid to cause delivery of the weighed out material deposited in said buckets.

15. Apparatus as defined in claim 13, further including, a switch responsive to bucket operation and operative to maintain said vibratory means shut off during the delivery phase of bucket operation.

16. Apparatus as defined in claim 13, further including, doors for said buckets, an electrical circuit having a solenoid, a master switch in said solenoid circuit for operatively energizing said solenoid, cam means and a cam follower operatively engaging said cam means for regulating the movement of said bucket doors from open position to shut position, said follower being responsive to operation of said solenoid and adapted to move from one to another of two positions in respect to said cam to maintain said doors positively open for one of said positions and positively shut for the other of said positions.

17. Apparatus as defined in claim 13, further including, doors for said buckets, an electrical circuit having a solenoid, a relay switch in the circuit of said solenoid and responsive to the operation of said second switch, a master switch in said solenoid circuit, cam means and a cam follower operatively engaging said cam means for regulating the movement of said bucket doors from open position to shut position, arrival of said member at said predetermined balancing position causing said second switch to close said relay switch to allow operation of said solenoid, actuation of said master switch energizing said solenoid, said follower being responsive to operation of said solenoid and adapted to move from one to another of two positions in respect to said cam to maintain said doors positively open for one of said positions and positively shut for the other of said positions.

18. Apparatus as defined in claim 13, further including, means for initiating the bucket delivery phase of operation comprising, an electrical circuit having a solenoid, a first relay switch in said solenoid circuit and responsive to the operation of said second switch, a master switch in said solenoid circuit, a second relay switch in said solenoid circuit and responsive to closing of said first relay switch and master switch, said second relay switch by-passing said first relay switch, arrival of said member at said predetermined balancing position causing said second switch to close said first relay switch to allow operation of said solenoid, closing of said master switch energizing said solenoid and closing said second relay switch in order to insure continuation of solenoid energization upon opening of said first relay switch, said buckets responding to energization of said solenoid by releasing the material deposited therein.

19. Apparatus as defined in claim 13, further including an electrical circuit having a solenoid and a master switch in said solenoid circuit, actuation of said master switch energizing said solenoid to cause release of material deposited in said buckets.

20. Apparatus as defined in claim 13, further including, means for readjusting individually and selectively the respective positions of said first and second switches in order to relocate said predetermined balancing and said other positions for regulating the flow of material to said buckets.

21. Scale apparatus for weighing out and delivering a preselected weight of flowable material furnished in bulk to said apparatus comprising, a relative immovable frame structure, a plurality of cantilever arms, a bucket suspended from the free ends of said arms and subject to movement in response to flow of material into said bucket, said bucket adapted to undergo alternate phases of operation, during one of said phases material is deposited into said bucket and weighed out and during the other of said phases the weighed out material is delivered by said bucket, an extension member having opposed ends one of which being pivotally supported by said frame structure, the other end of said member being adapted to move along a predetermined path of travel in response to bucket movement, there being a predetermined null position along the path of travel of the movable member when said bucket contains a quantity of material substantially equal to the preselected weight, said movable member being moved away from said null position when said bucket is empty and ready to receive the preselected weight, a framework assembly suspended from said cantilever arms and about said member, said framework assembly being disposed intermediate the ends of said member, a substantially taut and non-twisting band having opposed ends one of which being anchored to an intermediate portion of said member and the other end being anchored to said framework assembly, and switch means for regulating the flow of material into said bucket in response to predetermined positions assumed by said movable end of said member along its path of travel, said movable end approaching and finally reaching said null point as the flowable material in the bucket is progressively brought to and attains said preselected weight.

22. Apparatus as defined in claim 21, further including, spring means suspended between said cantilever arms and said immovable frame structure, said spring means exerting a force counterbalancing the weight of said bucket.

23. Apparatus as defined in claim 21, further including, a plurality of springs suspended between said cantilever arms and said immovable frame structure, said spring exerting opposing forces the aggregate of which counterbalances the weight of said bucket, means for adjusting the tension of one of said springs for regulating the aggregate counterbalancing force.

24. Scale apparatus for weighing out preselected weight of flowable material furnished in bulk to said apparatus comprising, a relatively immovable frame structure; a plurality of cantilever arms; a bucket suspended from the free ends of said arms and subject to movement in response to flow of material into said bucket; said bucket adapted to undergo alternate phases of operation, during one of said phases material is deposited into said bucket and weighed out and during the other of said phases the weighed out material is delivered by said bucket; a plurality of weighted cylindrically shaped drums; pairs of relatively taut, flexible, non-twisting bands suspending said drums for rotation about their respective axes in response to bucket movement; one band of each pair having opposed ends and one end of each being anchored to said frame structure and the other end thereof being anchored to the peripheral surface of a respective one of said drums; the second band of each pair having opposed ends and one end thereof being anchored to the peripheral surface of a respective drum and the other end being suspended from said cantilever arms; the point of anchorage of said first bands to said frame structure and the point of suspension of said second bands from said cantilever arms being respectively above and below the axis of rotation of said drums; the points of anchorage along the peripheral surface of said drums being diametrically opposite; an extension member having an end movable along a predetermined path of travel in response to bucket movement; there being a predetermined null position along the path of travel of said movable end when said bucket contains a quantity of material substantially equal to the preselected weight, the movable end of said member being moved away from said null position when said bucket is empty substantially to the extent of such preselected weight, and switch means for regulating the flow of material into said bucket in response to predetermined positions assumed by said movable end along its path of travel; said movable end of said member approaching and finally reaching said null point as the flowable material in the bucket is progressively brought to and attains said preselected weight, said drums being weighted to counterbalance the weight of said bucket.

25. Apparatus as defined in claim 24, wherein, said weighted drums include respective extension arms rotatable therewith, and a counterbalance adjustably disposed along each of said extension arms for shifting the path of travel of said movable end in respect to said switch means.

26. Apparatus as defined in claim 24, further including, means for adjusting the position of said switch means in order to relocate said predetermined positions for regulating the flow of material to said bucket.

27. Scale apparatus for weighing out a preselected weight of flowable material furnished in bulk to said apparatus comprising, a relatively immovable frame structure, a plurality of cantilever arms, a bucket suspended from the free ends of said arms and subject to movement in response to flow of material into said bucket, said bucket adapted to undergo alternate phases of operation, during one of said phases material is deposited into said bucket and weighed out and during the other of said phases the weighed out material is delivered by said bucket, a weighted cylindrical-shaped drum, a pair of relatively taut flexible and non-twisting bands suspending said drum for rotation about its axial dimension in response to bucket movement, said bands having opposed ends and one end of a first band being attached to said frame structure above the axis of rotation of said drum and the other end thereof being anchored to the peripheral surface of said drum, one end of said second band being anchored to the peripheral surface of said drum and the other end being suspended from said cantilever arms below the axis of rotation of said drum, the points of anchorage along the peripheral surface of said drum being diametrically opposite, an extension member having opposed ends one of which being anchored to said drum and turning integrally therewith, the other end of said member being adapted to move along predetermined path of travel in repsonse to bucket movement, there being a predetermined position along the path of travel of said movable end corresponding to the scale being in balance wherein, said bucket contains a quantity of material substantially equal to the preselected weight, and switch means for regulating the flow of material into said bucket in response to movement of said movable end along its path of travel, said scale being out of balance when said movable end is displaced from said predetermined balancing position, and said movable end approaching said predetermined balancing position as said scale is progressively brought into balance by flow of material into said bucket.

28. Apparatus as defined in claim 27, further including, a bearing surface, said drum being disposed to bear positively against said surface to prevent spurious movement of said member along an axis substantially normal to the path of travel of its movable end, damping means suspended between said cantilever arms and immovable frame structure to prevent spurious oscillations of said member.

29. Apparatus as defined in claim 27, further including, a counterbalance adjustably disposed along said member for shifting the path of travel of said movable end in respect to said switch means.

30. Apparatus as defined in claim 27, further including, spring means suspended between said cantilever arms and immovable frame structure, said spring means exerting a force counterbalancing the weight of said bucket.

31. Apparatus as defined in claim 27, further including, means for adjusting the position of said switch means in order to relocate said predetermined positions assumed by said movable end in respect to said switch means for regulating the flow of material to said bucket.

32. Scale apparatus for weighing out and delivering a preselected weight of flowable material comprising, a relatively fixed frame structure, a plurality of cantilever arms having free ends, the other ends of said arms being fixed to said structure, a bucket suspended from the free ends of said cantilever arms and subject to movement in response to the deposit of material therein, said bucket being adapted to undergo alternate phases of operation wherein material is deposited into said bucket and weighed out by the scale during one phase of operation and wherein the weighed out quantity of material is delivered by said bucket during the other phase of its operation, a plurality of weighted cylindrical drums between said frame structure and said bucket, a pair of relatively taut and non-twisting bands suspending each drum for rotation about the axial dimension thereof in response to bucket movement, one band of each pair being anchored to said frame and depending therefrom and having its other end anchored to the peripheral surface of a respective one of said drums, a second band of each pair having one end thereof anchored to the peripheral surface of its correlated drum and its other end anchored to said bucket, the point of anchorage of the first band of each pair to said frame structure and the point of anchorage of the second mentioned bands of each pair to said bucket being respectively above and below the axis of rotation of said drums, and the points of anchorage along the peripheral surfaces of the drums being diametrically opposite, an extension member operatively associated with said bucket and experiencing movement corresponding to bucket movement, said extension member having a free end adapted for movement along a predetermined path of travel in response to bucket movement, said member at its other end being anchored to said drums so as to turn integrally therewith, whereby movement of said free end of said member along its path of travel is a mechanical magnification of bucket movement, there being a predetermined null position along the path of travel of said free end when said bucket contains a quantity of material substantially equal to the preselected weight, and switch means responsive to movement of the free end of said member whereby the flow of material deposited into said bucket is regulated by said switch means in response to successive positions assumed by said member as it moves along its path of travel.

33. Scale apparatus according to claim 32 wherein said weighted drums include respective extension arms rotatable therewith, a counterbalance adjustably disposed along each extension arm wherein readjustment of the counterbalances shifts the path of travel of said member with respect to said switch means.

34. Scale apparatus for weighing out and delivering a preselected weight of flowable material furnished in bulk to said apparatus comprising, a relatively fixed frame structure, a plurality of cantilever arms having free ends, the other ends of said arms being fixed to said structure, a bucket suspended from the free ends of said cantilever arms and subject to movement in response to the deposit of material therein, said bucket being adapted to undergo alternate phases of operation wherein material is deposited into said bucket and weighed out by the scale during one phase of operation and wherein the weighed out quantity of material is delivered by said bucket during the other phase of its operation, a weighted drum suspended between said frame structure and said bucket, means mounting said drum for rotatable linear movement along the bucket, means tying said drum to said bucket, an extension member operatively associated with said bucket and experiencing movement corresponding to bucket movement, said extension member having a free end adapted for movement along a predetermined path of travel in response to bucket movement, magnetic means mounted on said free end of said member and movable therewith, said member at its other end being anchored to said drum so as to turn integrally therewith, whereby movement of said free end of said member along its path of travel is a mechanical magnification of bucket movement, there being a predetermined null position along the path of travel of said free end magnetic means when said bucket contains a quantity of material substantially equal to the preselected weight, and switch means responsive to movement of said magnetic means whereby the flow of material deposited into said bucket is regulated by said switch means in response to successive positions assumed by said magnetic means as the free end of said member moves along its path of travel.

References Cited in the file of this patent

UNITED STATES PATENTS

| | | |
|---|---|---|
| 607,465 | Richards | July 19, 1898 |
| 1,009,093 | Prouty | Nov. 21, 1911 |
| 1,278,291 | Balwick | Sept. 10, 1918 |
| 1,336,705 | Leumann | Apr. 13, 1920 |
| 1,923,745 | Platzer | Aug. 22, 1933 |
| 2,116,934 | Rapp | May 10, 1938 |
| 2,139,903 | Mason | Dec. 13, 1938 |
| 2,212,419 | Harman | Aug. 20, 1940 |
| 2,226,236 | Bleam | Dec. 24, 1940 |
| 2,352,114 | Muskat | June 20, 1944 |
| 2,610,726 | Howard | Sept. 16, 1952 |
| 2,614,786 | Caron | Oct. 21, 1952 |
| 2,699,329 | Bean | Jan. 11, 1955 |
| 2,726,061 | Schieser | Dec. 6, 1955 |
| 2,751,180 | Howard | June 19, 1956 |
| 2,868,375 | Howard | Jan. 13, 1959 |
| 2,890,013 | Schieser | June 9, 1959 |
| 2,904,304 | Zwoyer | Sept. 15, 1959 |
| 2,932,483 | Dodd | Apr. 12, 1960 |

FOREIGN PATENTS

| | | |
|---|---|---|
| 75,739 | Norway | Oct. 10, 1949 |

UNITED STATES PATENT OFFICE
CERTIFICATE OF CORRECTION

Patent No. 3,081,832                      March 19, 1963

Walter R. Zwoyer, Ruth A. Freebody, The Hackensack Trust Company and Thelma I. Knoechel, executors of the Estate of said Walter R. Zwoyer, deceased It is hereby certified that error appears in the above numbered patent requiring correction and that the said Letters Patent should read as corrected below.

Column 8, line 7, strike out "the", first occurrence; column 16, line 17, for "Gude" read -- Guide --; column 20, line 9, for "deflectors" read -- deflector --; same line, strike out "one", first occurrence; line 40, for "weighted" read -- weighed --; same column, line 42, after "movement" insert "with said bucket"; column 21, line 41, for "furthed" read -- further --; column 22, line 35, for "spring" read -- springs --; column 23, line 40, for "repsonse" read -- response --; column 26, under the heading "UNITED STATES PATENTS", add the following:

2,736,923    Scheiser ---------- Mar. 6, 1956

Signed and sealed this 12th day of November 1963.

(SEAL)
Attest:
ERNEST W. SWIDER
Attesting Officer

EDWIN L. REYNOLDS
Acting Commissioner of Patents